United States Patent
Rimini et al.

(10) Patent No.: US 10,871,549 B2
(45) Date of Patent: Dec. 22, 2020

(54) PROXIMITY DETECTION USING ADAPTIVE MUTUAL COUPLING CANCELLATION

(71) Applicant: Qualcomm Incorporated, San Diego, CA (US)

(72) Inventors: Roberto Rimini, San Diego, CA (US); Anant Gupta, Santa Barbara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 15/984,233

(22) Filed: May 18, 2018

(65) Prior Publication Data
US 2019/0353750 A1 Nov. 21, 2019

(51) Int. Cl.
*G01S 7/02* (2006.01)
*G01S 13/08* (2006.01)

(52) U.S. Cl.
CPC .............. *G01S 7/023* (2013.01); *G01S 13/08* (2013.01)

(58) Field of Classification Search
CPC ........ G01S 7/023; G01S 13/08; G01S 7/2921; G01S 7/354; G01S 7/038; G01S 13/86; G01S 13/88; G01S 13/282; G01S 13/343; G01S 13/345; H04W 52/283; H04W 52/146; H04B 1/126; H04B 1/3838; H01Q 1/245; H01Q 9/26; H01Q 21/062; H01Q 21/065; H01Q 21/28; H01Q 1/523; H01Q 1/243
USPC .......................................................... 342/85
See application file for complete search history.

(56) References Cited

U.S. PATENT DOCUMENTS

| | | | | |
|---|---|---|---|---|
| 8,190,854 B2 * | 5/2012 | Codrescu | ............ | G06F 9/30021 712/3 |
| 8,755,738 B2 * | 6/2014 | Forutanpour | ......... | H04L 67/306 455/3.01 |
| 2006/0049992 A1 * | 3/2006 | Tsai | ..................... | H01Q 1/2283 343/702 |

(Continued)

FOREIGN PATENT DOCUMENTS

| | | |
|---|---|---|
| CN | 102023292 B | 8/2012 |
| DE | 102015119482 A1 | 5/2017 |
| EP | 2352234 A1 | 8/2011 |

OTHER PUBLICATIONS

International Search Report and Written Opinion—PCT/US2019/031192—ISA/EPO —dated Aug. 8, 2019.

*Primary Examiner* — Bo Fan
(74) *Attorney, Agent, or Firm* — Colby Nipper / Qualcomm

(57) ABSTRACT

An apparatus is disclosed for proximity detection using adaptive mutual coupling cancellation. In an example aspect, the apparatus includes at least two antennas, a wireless transceiver connected to the at least two antennas, and a mutual coupling cancellation module. The at least two antennas include a first antenna and a second antenna, which are mutually coupled electromagnetically. The second antenna includes two feed ports. The wireless transceiver is configured to transmit a radar transmit signal via the first antenna and receive two versions of a radar receive signal respectively via the two feed ports of the second antenna. The wireless transceiver is also configured to adjust a transmission parameter based on a decoupled signal. The transmission parameter varies based on a range to the object. The mutual coupling cancellation module is configured to generate the decoupled signal based on the two versions of the radar receive signal.

30 Claims, 13 Drawing Sheets

(56) References Cited

U.S. PATENT DOCUMENTS

2014/0098681 A1* 4/2014 Stager ............... H04W 24/02
370/252
2017/0290011 A1* 10/2017 Kushnir ............... G01S 13/34

* cited by examiner

PROXIMITY DETECTION USING ADAPTIVE MUTUAL COUPLING CANCELLATION

TECHNICAL FIELD

This disclosure relates generally to wireless transceivers and, more specifically, to cancelling interference between at least two antennas. Certain embodiments enable and provide techniques for cancelling interference for antennas that are mutually coupled electromagnetically and are being used for proximity detection.

INTRODUCTION

To increase transmission rates and throughput, cellular and other wireless networks are using signals with higher frequencies and smaller wavelengths. As an example, fifth generation (5G)-capable devices communicate with networks using frequencies that include those at or near the extremely-high frequency (EHF) spectrum (e.g., frequencies greater than 25 gigahertz (GHz)) with wavelengths at or near millimeter wavelengths. These signals have various technological challenges, such as higher path loss as compared to signals for earlier generations of wireless communications. In certain scenarios it can be difficult for a 5G wireless signal to travel far enough to make cellular communications feasible at these higher frequencies.

Transmit power levels can be increased or beamforming can concentrate energy in a particular direction to compensate for the higher path loss. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to realize given cost, size, functional design objectives and/or involved constraints.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An apparatus is disclosed that implements proximity detection using adaptive mutual coupling cancellation. The described techniques utilize an existing wireless transceiver and antennas within a computing device to transmit and receive radar signals and determine a range (e.g., a distance or slant range) to an object. Due to a proximity of the antennas with respect to each other, the antennas are electromagnetically mutually coupled such that energy can leak between a transmitting antenna and a receiving antenna. To detect the object in the presence of this self-made interference, a mutual coupling cancellation module combines at least two receive signals in such a way as to suppress or attenuate the mutual coupling interference. The at least two receive signals can be obtained from at least two feed ports that are associated with a same antenna or different antennas.

Two described example implementations of the mutual coupling cancellation module utilize a zero-forcing combiner module or a reciprocal cancellation module to process the at least two receive signals. A decoupled signal can be produced by suppressing the mutual coupling interference and thereby enabling weak reflections of the radar signal to be analyzed for proximity detection. Based on this analysis, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). By actively measuring the range to an object, a surrounding environment can be continually monitored and the transmission parameter can be incrementally adjusted to account for movement by the object.

In an example aspect, an apparatus is disclosed. The apparatus includes at least two antennas, a wireless transceiver connected to the at least two antennas, and a mutual coupling cancellation module. The at least two antennas include a first antenna and a second antenna. The second antenna includes two feed ports. The first antenna and the second antenna are mutually coupled electromagnetically. The wireless transceiver is configured to transmit a radar transmit signal via the first antenna and receive two versions of a radar receive signal respectively via the two feed ports of the second antenna. The radar receive signal comprises a reflected component corresponding to a reflection of the radar transmit signal via an object and a mutual coupling component corresponding to a transmission of the radar transmit signal via the first antenna. The wireless transceiver is also configured to adjust a transmission parameter based on a decoupled signal. The transmission parameter varies based on a range to the object. The mutual coupling cancellation module is connected to the two feed ports and is configured to generate the decoupled signal based on the two versions of the radar receive signal.

In an example aspect, an apparatus is disclosed. The apparatus includes at least two antennas and a wireless transceiver connected to the at least two antennas. The at least two antennas include a first antenna and a second antenna. The first antenna and at least the second antenna are mutually coupled electromagnetically. The wireless transceiver is configured to transmit a radar transmit signal via the first antenna and receive multiple versions of a radar receive signal via multiple feed ports including at least one feed port of the second antenna. The radar receive signal comprises a reflected component corresponding to a reflection of the radar transmit signal via an object and a mutual coupling component corresponding to a transmission of the radar transmit signal via the first antenna. The wireless transceiver is also configured to adjust a transmission parameter based on a decoupled signal. The transmission parameter varies based on a range to the object. The apparatus also includes a mutual coupling cancellation circuit connected to the multiple feed ports. The mutual coupling cancellation circuit is configured to generate the decoupled signal based on the multiple versions of the radar receive signal such that the mutual coupling component is suppressed.

In an example aspect, a method for proximity detection using adaptive mutual coupling cancellation is disclosed. The method includes transmitting a radar transmit signal via a first antenna and receiving multiple versions of a radar receive signal via multiple feed ports including at least one feed port of a second antenna. The first antenna and the second antenna are mutually coupled electromagnetically.

The radar receive signal comprises a reflected component corresponding to a reflection of the radar transmit signal via an object and a mutual coupling component corresponding to a transmission of the radar transmit signal via the first antenna. The method also includes generating a decoupled signal by processing the multiple versions of the radar receive signal such that the mutual coupling component is attenuated. Based on the decoupled signal, the method includes adjusting a transmission parameter, which is varied according to a range to the object.

In an example aspect, an apparatus is disclosed. The apparatus includes at least two antennas and a mutual coupling cancellation module. The at least two antennas include a first antenna and a second antenna. The second antenna includes multiple feed ports. The first antenna is configured to generate radiation. The first antenna and the second antenna are mutually coupled electromagnetically. The second antenna is configured to generate multiple versions of a radio-frequency signal respectively via the multiple feed ports, with the multiple versions of the radio-frequency signal including interference indicative of the radiation generated by the first antenna. The mutual coupling cancellation module includes a zero-forcing combiner module and a reciprocal cancellation module. The zero-forcing combiner module is configured to combine interference null-space projections of the multiple versions of the radio-frequency signal to attenuate the interference. The reciprocal cancellation module is configured to scale a version of the multiple versions of the radio-frequency signal to produce a scaled signal and to subtract the scaled signal from another version of the multiple versions of the radio-frequency signal to attenuate the interference.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF DRAWINGS

FIG. 10-1 is a flow diagram illustrating an example process for proximity detection using adaptive mutual coupling cancellation.

FIG. 10-2 is a flow diagram illustrating another example process for proximity detection using adaptive mutual coupling cancellation.

FIG. 11-1 is a flow diagram illustrating yet another example process for proximity detection using adaptive mutual coupling cancellation.

FIG. 11-2 is a flow diagram illustrating still another example process for proximity detection using adaptive mutual coupling cancellation.

DETAILED DESCRIPTION

Figure 1:
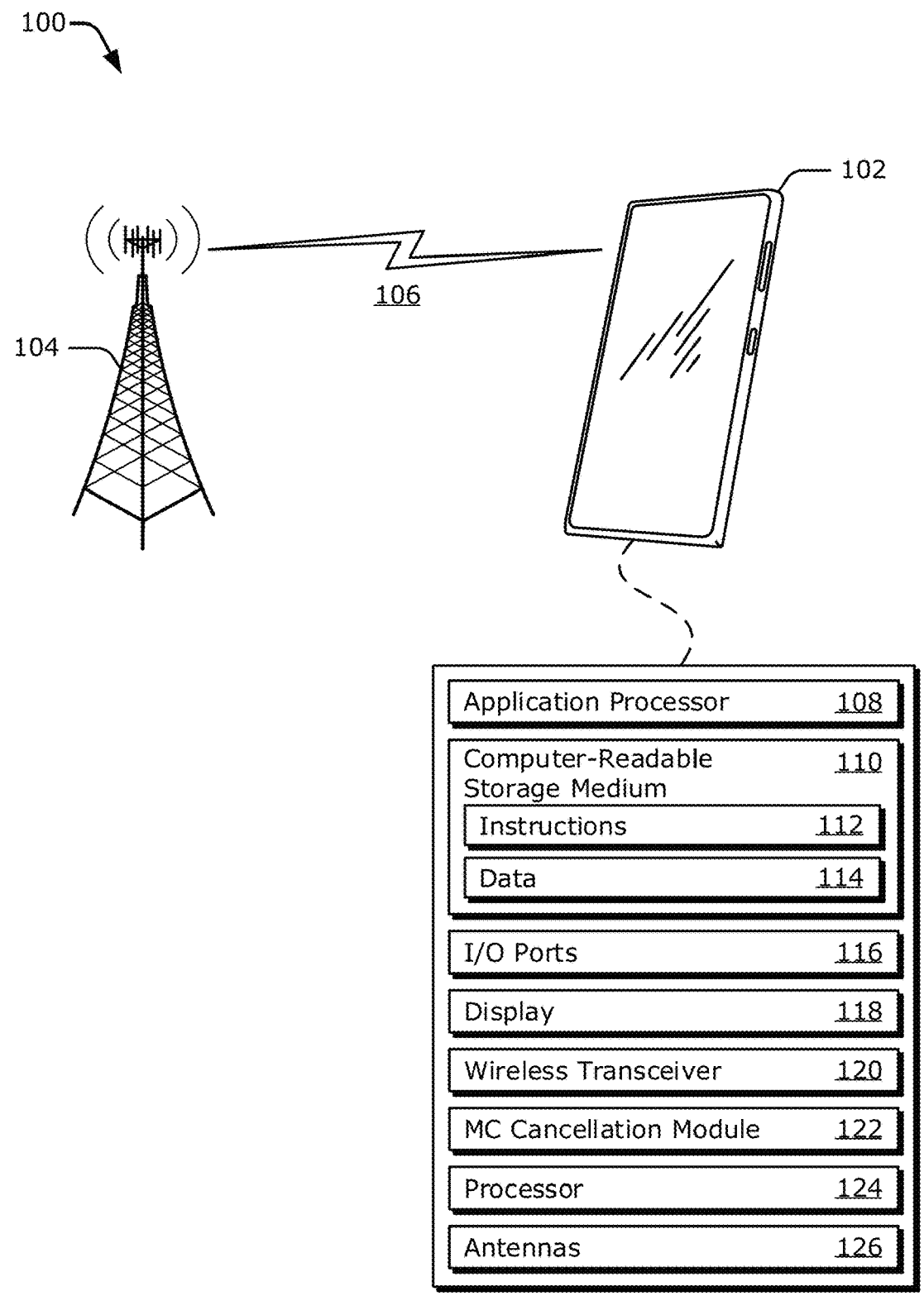
FIG. 1 illustrates an example computing device for proximity detection using adaptive mutual coupling cancellation.

Current high-frequency and small-wavelength communications struggle to balance performance with a need to meet the Federal Communications Commission's maximum permitted exposure limit (e.g., the FCC's MPE limit). This struggle can prevent devices from taking full advantage of increased data rates (e.g., those enabled by 5G wireless communications). Because the MPE limit is affected by the proximity of a user to a device's antenna, however, techniques described in this document enable greater wireless performance while staying within the FCC's MPE limit. To do so, these techniques detect a user's proximity to a device. Based on the detected proximity, the device can balance a power density of transmitted wireless signals with the requirement to meet the MPE limit. As a result, the device is permitted to transmit wireless signals with higher average power levels, which enables the wireless signals to travel farther, such as between a smart phone and a remote cellular base station.

Some proximity-detection techniques may use a dedicated sensor to detect the user, such as a camera or an infrared sensor. However, these sensors may be bulky or expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for proximity detection using adaptive mutual coupling cancellation are described herein. The described techniques utilize an existing wireless transceiver and antennas within a computing device to transmit and receive radar signals and determine a range (e.g., a distance or slant range) to an object. Due to a proximity of the antennas with respect to each other, the antennas are mutually coupled such that energy can leak between a transmitting antenna and a receiving antenna. To detect the object in the presence of this self-made interference, a mutual coupling cancellation module processing at least two receive signals in such a way as to suppress or attenuate the mutual coupling. The at least two receive signals can be obtained from at least two feed ports that are associated with a same antenna or different antennas.

Two described implementations of the mutual coupling cancellation module utilize a zero-forcing combiner module or a reciprocal cancellation module to process the at least two receive signals. The mutual coupling cancellation results in a decoupled signal that enables weak reflections of the radar signal to be analyzed for proximity detection. Based on this analysis, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). Further, by actively measuring the range to an object, a surrounding environment can be continually monitored and the transmission parameter can be incrementally adjusted to account for movement by the object.

Some embodiments may offer a relatively inexpensive approach that can utilize existing transceiver hardware and antennas. The mutual coupling cancellation module marginally impacts a design of the wireless transceiver and can be implemented in software or hardware. The described techniques need not utilize a calibration procedure or training sequence (e.g., those involving a characterization of a mutual coupling channel). Instead, estimations of the mutual coupling channel occur in real-time, thereby enabling responsive adaptation to various changes in antenna impedance or load variations. Such variations can occur due to a proximity of a user's hand to an antenna, solar loading, and so forth. With this adaptive capability, proximity detection can be performed using a variety of different antenna designs or antenna array configurations.

In some implementations, the wireless transceiver may be utilized in stand-alone proximity-detection applications. For example, the wireless transceiver can be implemented as an automotive bumper sensor to assist with parking or autonomous driving. As another example, the wireless transceiver can be installed on a drone to provide collision avoidance. In other implementations, the wireless transceiver can selectively perform proximity detection or wireless communication. In such cases, this enables dual-use of components within the transmit and receive chains of a wireless transceiver of a computing device, which decreases cost and size of the wireless transceiver, as well as the computing device. Based on the proximity detection, and as described herein, transmission parameters can be adjusted for wireless communication to enable the wireless transceiver to meet safety guidelines promulgated by the government or the wireless industry, such as a Maximum Permitted Exposure (MPE) limit as determined by the Federal Communications Commission (FCC).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio-frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitutions.

FIG. 1 illustrates an example computing device 102 for proximity detection using adaptive mutual coupling cancellation. In an example environment 100, the computing device 102 communicates with a base station 104 through a wireless communication link 106 (wireless link 106). In this example, the computing device 102 is implemented as a smart phone or sometimes known as a user equipment/terminal. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radio apparatus, entertainment device, wearable, implantable, pharmaceutical device, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), 5th Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

As shown, the computing device 102 includes an application processor 108 and a computer-readable storage medium 110 (CRM 110). The application processor 108 may include any type of processor that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to networks and/or other electronic wireless devices. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting and receiving signals via two or more antennas 126. Components of the wireless transceiver 120 can include amplifiers, mixers, switches, analog-to-digital converters, filters, and so forth for conditioning signals. The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains).

The computing device 102 also includes a mutual coupling (MC) cancellation module 122. The mutual coupling cancellation module 122 can be connected to a wireless transceiver 120 and a processor 124. As used herein, the term "connect" or "connected" refers to an electrical connection, including a direct connection (e.g., connecting discrete circuit elements via a same node) or an indirect connection (e.g., connecting discrete circuit elements via one or more other devices or other discrete circuit elements). The mutual coupling cancellation module 122 and the processor 124 can be respectively implemented within or separate from the wireless transceiver 120. The mutual coupling cancellation module 122 can be implemented in software or hardware. In some instances, the mutual coupling cancellation module 122 can be incorporated in or realized using software, firmware, hardware, fixed logic circuitry, or combinations thereof. The mutual coupling cancellation module 122 can be implemented within an integrated circuit or as part of the processor 124 or other electronic component of the computing device 102. In some implementations, the processor 124 may execute computer-executable instructions that are stored within the CRM 110 to implement the mutual coupling cancellation module 122. In operation, the mutual coupling cancellation module 122 can cancel self-made interference (e.g., interference due to mutual coupling) to enable detection of relatively weak reflections that are analyzed for proximity detection. Thus, the mutual coupling cancellation module 122 can at least partially implement proximity detection using adaptive mutual coupling cancellation, as described in FIGS. 6-9.

The processor 124, which can be implemented as a modem or part of a modem, controls the wireless transceiver 120 and enables wireless communication or proximity detection to be performed. The processor 124 can include a portion of the CRM 110 or can access the CRM 110 to obtain computer-readable instructions. The processor 124 can include baseband circuitry to perform high-rate sampling processes that can include analog-to-digital conversion, digital-to-analog conversion, Fourier transforms, gain correction, skew correction, frequency translation, and so forth. The processor 124 can provide communication data to the wireless transceiver 120 for transmission. The processor 124 can also process a baseband version of a signal obtained from the wireless transceiver 120 to generate data, which can be provided to other parts of the computing device 102 via a communication interface for wireless communication or proximity detection.

The wireless transceiver 120 can also include a controller (not shown), e.g., to realize the mutual coupling cancellation module 122. The controller can include at least one processor and CRM, which stores computer-executable instructions (such as the application processor 108, the CRM 110, and the instructions 112). The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the processor 124, the application processor 108, a special-purpose processor configured to perform MPE techniques, a general-purpose processor, some combination thereof, and so forth.

Figure 2:
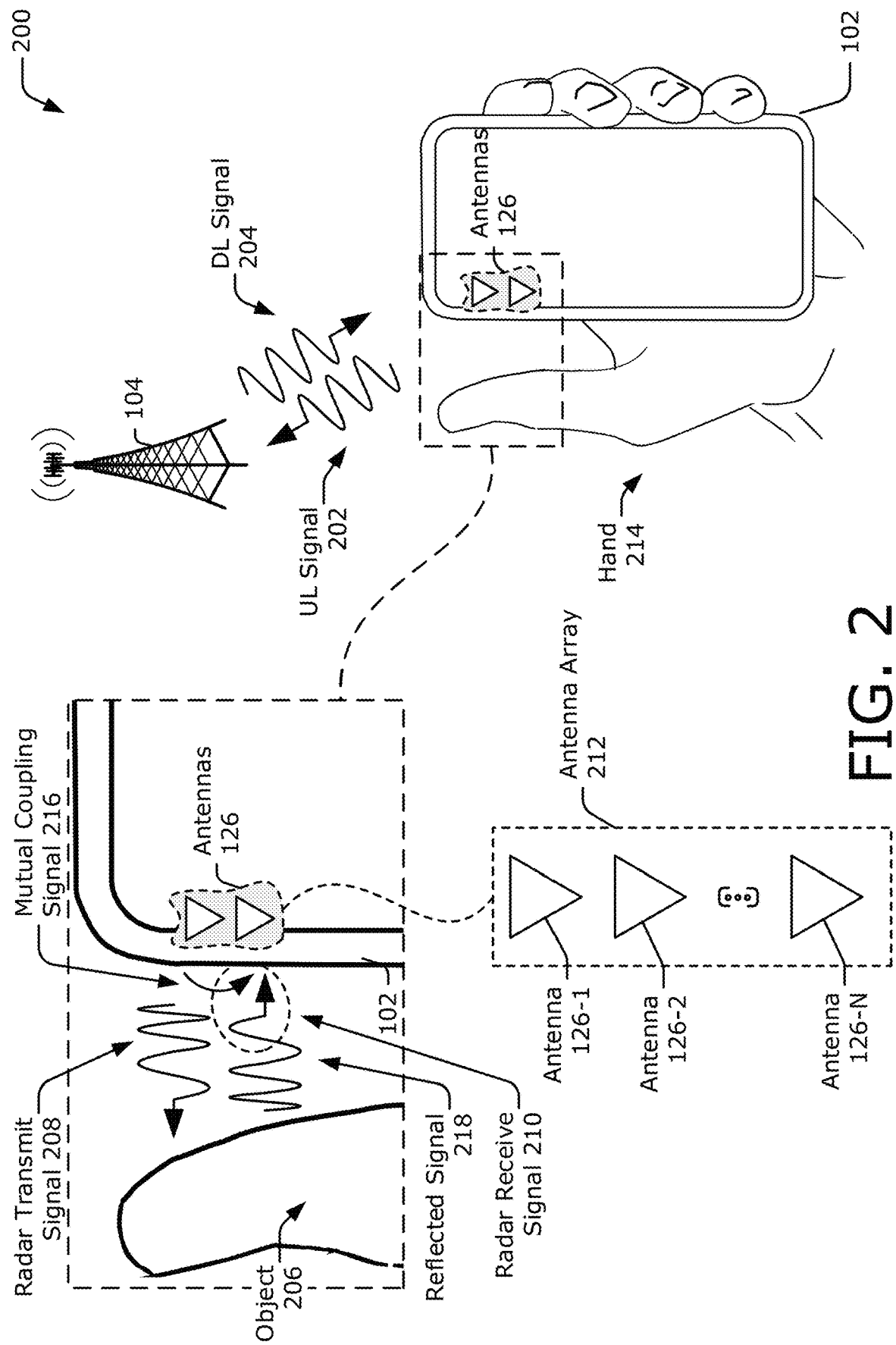
FIG. 2 illustrates an example operating environment for proximity detection using adaptive mutual coupling cancellation.

FIG. 2 illustrates an example operating environment 200 for proximity detection using adaptive mutual coupling cancellation. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via the two or more antennas 126. A user's thumb, however, can represent a proximate object 206 that may be exposed to radiation via the uplink signal 202.

To detect whether the object 206 exists or is within a detectable range, the computing device 102 transmits a radar transmit signal 208 via at least one of the antennas 126 and receives a radar receive signal 210 via at least another one of the antennas 126. In some cases, the radar receive signal 210 can be received during a portion of time that the radar transmit signal 208 is transmitted. The radar transmit signal 208 can be implemented as a frequency-modulated continuous-wave (FMCW) signal or a frequency-modulated pulsed signal. The type of frequency modulation can include a linear frequency modulation, a triangular frequency modulation, a sawtooth frequency modulation, and so forth. Based on the radar receive signal 210, the range to the object 206 can be determined.

In FIG. 2, the radar receive signal 210 is shown to include both a reflected signal 218 and a mutual coupling signal 216. The reflected signal 218 includes a portion of the radar transmit signal 208 that is reflected by the object 206, and the mutual coupling signal 216 includes another portion of the radar transmit signal 208 that is not reflected by the object 206. A propagation distance between the antennas 126 and the object 206 and a partial absorption of the radar transmit signal 208 via the object 206 causes the reflected signal 218 to be weaker relative to the mutual coupling signal 216. The reflected signal 218 may also have a different phase or frequency relative to the radar transmit signal 208 and the mutual coupling signal 216 based on reflection properties or motion of the object 206. In general, the reflected signal 218 contains information that can be used for detecting the object 206 and for determining a range to the object 206.

The mutual coupling signal 216 exists within the radar receive signal 210 due to a direct or indirect coupling between the antennas 126 (e.g., the antennas 126 are mutually coupled). In the depicted configuration, the antennas 126 are co-located or otherwise proximate to one another. Due to this proximity, the antennas 126 are mutually coupled electromagnetically such that a portion of the energy that is radiated via one of the antennas 126 generates interference that makes it challenging to detect the reflected signal 218 due to the mutual coupling signal 216.

The antennas 126 may be arranged via modules and may have a variety of configurations. For example, the antennas 126 may comprise at least two different antennas, at least two antenna elements of an antenna array 212 (as shown towards the bottom of FIG. 2), at least two antenna elements associated with different antenna arrays, or any combination thereof. The antenna array 212 is shown to include multiple antennas 126-1 to 126-N, where N represents a positive integer greater than one. Further, the array 212 may be arranged in multi-dimensional arrays. Additionally or alternatively, the array 212 may be configured for beam management techniques, such as beam determination, beam measurement, beam reporting, or beam sweeping. A distance between the antennas 126 within the antenna array 212 can be based on frequencies that the wireless transceiver 120 emits. For example, the antennas 126 can be spaced apart by approximately half a wavelength from one another (e.g., by approximately half a centimeter (cm) apart for frequencies around 30 GHz). The antennas 126 may be implemented using any type of antenna, including patch antennas, dipole antennas, bowtie antennas, or a combination thereof, as further described with respect to FIGS. 3 and 4.

Consider, for example, the antennas 126 as comprising the first antenna 126-1 and the second antenna 126-2 of the antenna array 212. The first antenna 126-1 transmits the radar transmit signal 208, and the second antenna 126-2 receives the radar receive signal 210. The mutual coupling between the antennas 126 cause a portion of the radar transmit signal 208, which is represented by the mutual coupling signal 216, to leak into or be received by the second antenna 126-2. Because the mutual coupling signal 216 is significantly stronger than the reflected signal 218 (e.g., by approximately 25 dB or more), the mutual coupling signal 216 can prevent the computing device 102 from detecting the object 206, absent implementation of a technique to cancel the mutual coupling component. For example, the reflected signal 218 can be obscured by sidelobes of the mutual coupling signal 216. The mutual coupling cancellation module 122, however, attenuates the mutual coupling signal 216 to enable the object 206 to be detected using the mutually-coupled antennas 126. Based on the proximity detection, a transmission parameter can be adjusted for use during wireless communication. An example sequence for switching between wireless communication and proximity detection is further described with respect to FIG. 3

Figure 3:
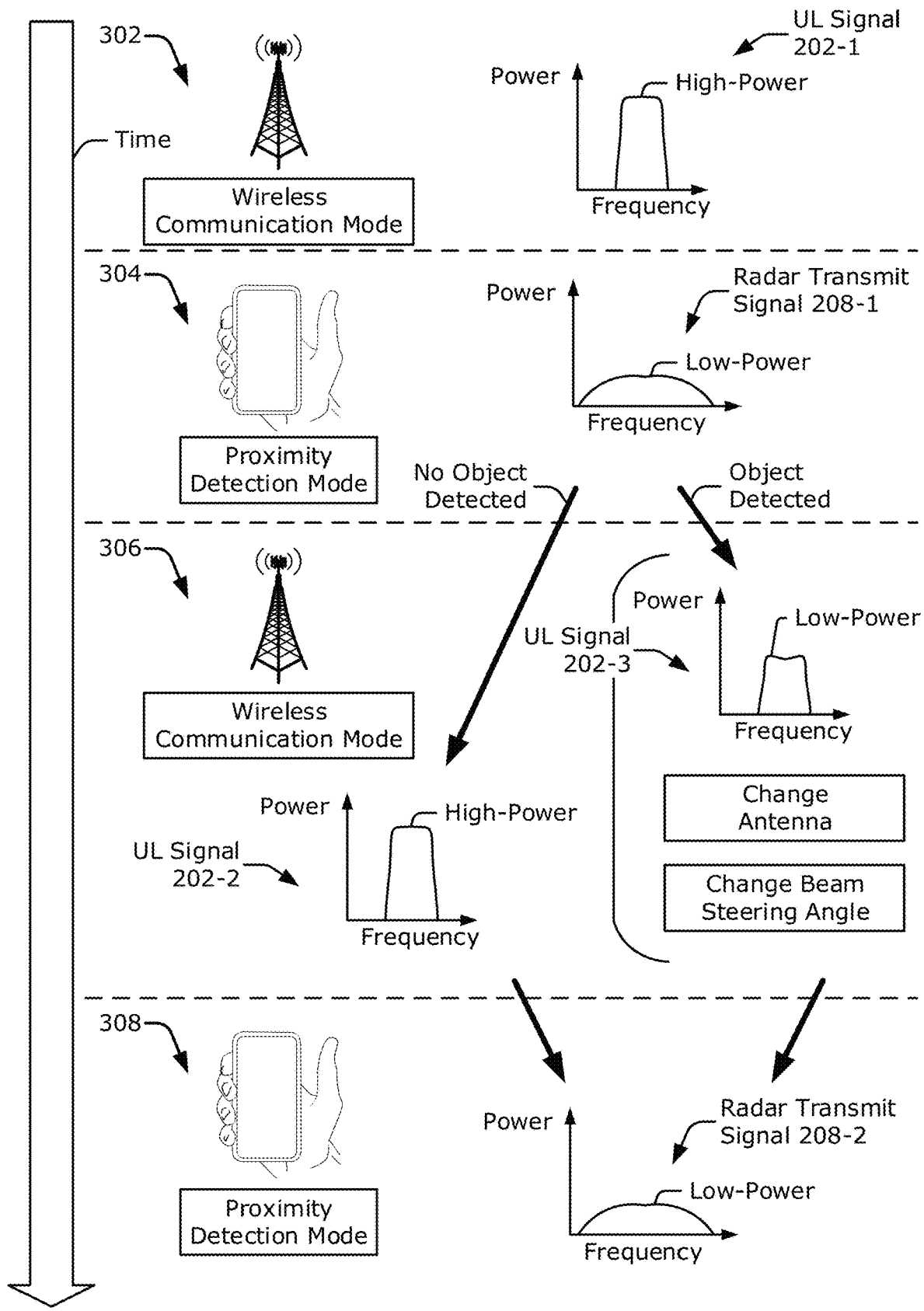
FIG. 3 illustrates an example sequence flow diagram for proximity detection using adaptive mutual coupling cancellation.

FIG. 3 illustrates an example sequence flow diagram for proximity detection using adaptive mutual coupling cancellation, with time elapsing in a downward direction. Examples of a wireless communication mode are shown at 302 and 306, and examples of a proximity detection mode are shown at 304 and 308. The proximity detection modes can occur at fixed time intervals, between active data cycles that occur during wireless communication, at predetermined times as set by the processor 124, as part of an initialization process before wireless communications occur, responsive to detection of device movement, or based on indications that the user may be proximate to the device (e.g., based on the wireless transceiver 120 observing a decrease in power in a downlink signal 204 or the application processor 108 determining that the user is interacting with the display 118 of the computing device 102).

At 302, the wireless transceiver 120 transmits a high-power (e.g., normal) uplink signal 202-1 configured to provide sufficient range to a destination, such as a base station 104. After transmitting the uplink signal 202-1, the radar transmit signal 208-1 is transmitted via the wireless transceiver 120 and the antennas 126 at 304. As described above, a radar transmit signal 208 enables the computing device 102 to detect an object 206 and determine if the object 206 is near the computing device 102. In this case, the radar transmit signal 208-1 is represented by a low-power wide-band signal. Based on a detection, the wireless transceiver 120 can adjust a transmission parameter for a next uplink signal 202 to account for MPE compliance guidelines.

The proximity detection mode can also determine the range to the object 206, thereby enabling transmission of the uplink signal 202 to comply with range-dependent guidelines, such as a maximum power density. Because power density is proportional to transmit power and inversely proportional to range, an object 206 at a closer range is exposed to a higher power density than another object 206 at a farther range for a same transmit power level. Therefore, a similar power density at the object 206 can be achieved by increasing the transmit power level if the object 206 is at a farther range and decreasing the transmit power level if the object 206 is at a closer range. In this way, the wireless transceiver 120 can adjust transmission of the uplink signal 202 to enable the power density at the object 206 for both the closer range and the farther range to be below the maximum power density. At the same time, because the range is known, the transmit power level can be increased to a level that facilitates wireless communication and comports with the compliance guideline.

At 306, the wireless transceiver 120 transmits a next uplink signal 202. In the depicted example, a high-power uplink signal 202-2 is transmitted if an object 206 is not detected. Alternatively, a low-power uplink signal 202-3 is transmitted if the object 206 is detected. The low transmit power can be, for example, between approximately five and twenty decibel-milliwatts (dBm) less than the high-power signal at 302. In addition to or instead of changing a power of the next uplink signal 202, the uplink signal 202 can be transmitted using a different antenna within the computing device 102 or using a different beam steering angle (e.g., different than the antennas 126 or the beam steering angle used for transmitting the uplink signal 202-1 at 302). Although not shown, the wireless transceiver 120 can alternatively skip the wireless communication mode at 306 and perform another proximity detection mode using another antenna or a different transmit power level to detect objects 206 at various locations or distances around the computing device 102.

At 308, the wireless transceiver 120 and antennas 126 transmit another radar transmit signal 208-2 to attempt to detect the object 206. By scheduling multiple radar transmit signals 208 over some time period, transmission of the uplink signal 202 can be dynamically adjusted based on a changing environment or movement by the object 206. Furthermore, appropriate adjustments can be made to balance communication performance with compliance or radiation requirements.

The sequence described above can also be applied to other mutually-coupled antennas. The other antennas and the antennas 126 may transmit multiple radar transmit signals 208 sequentially or in parallel. To enable proximity detection through the use of mutually-coupled antennas 126, the wireless transceiver 120 receives the radar receive signal 210 of FIG. 2 via at least two feed ports, which are further described with respect to FIG. 4.

Figure 4:
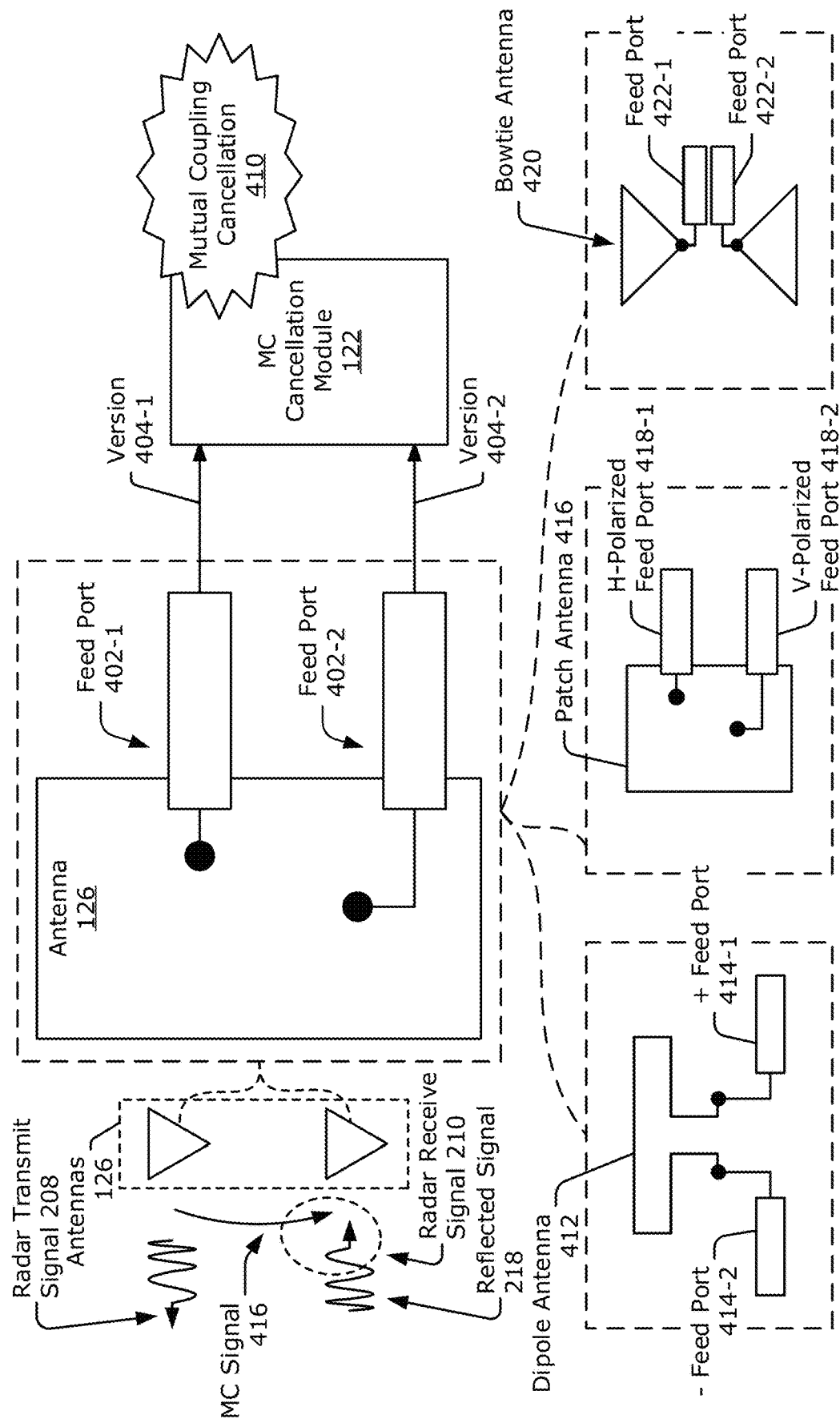
FIG. 4 illustrates multiple examples of an antenna for proximity detection using adaptive mutual coupling cancellation.

FIG. 4 illustrates an example antenna 126 for proximity detection using adaptive mutual coupling cancellation and three example implementations thereof. The example antenna 126 illustrated in FIG. 4 can be used to implement either of the antennas 126 (e.g., a transmitting antenna or a receiving antenna). In general, the antenna 126 in FIG. 4 is described with respect to a receiving antenna 126. In the depicted configuration (in the top half of FIG. 4), the antenna 126 includes multiple feed ports 402, such as a first feed port 402-1 and a second feed port 402-2. The response of the antenna 126 to the radar receive signal 210 is separated into multiple versions 404, such as versions 404-1 and 404-2 respectively obtained via the feed ports 402-1 and 402-2. Although similar, the multiple versions 404 of the radar receive signal 210 vary due to differences in a type of feed port 402 or differences due to location or orientation of the feed ports 402-1 and 402-2. These versions 404-1 and 404-2 are used by the mutual coupling cancellation module 122 to perform mutual coupling cancellation 410.

Three example types of antenna 126 are depicted towards the bottom of FIG. 4. In one example, the antenna 126 comprises a dipole antenna 412, which includes a pair of differential feed ports 414 (e.g., a positive (+) feed port 414-1 and a negative (−) feed port 414-2). Thus, the feed ports 402-1 and 402-2 can be implemented using the differential feed ports 414-1 and 414-2 such that the versions 404-1 and 404-2 are out-of-phase with respect to each other (e.g., differ in phase by approximately 180 degrees). As another example, the antenna 126 comprises a patch antenna 416, which includes a horizontally-polarized feed port 418-1 and a vertically-polarized feed port 418-2. Accordingly, the versions 404-1 and 404-2 have orthogonal polarities if the feed ports 402-1 and 402-2 are implemented using the polarized feed ports 418. In this instance, the versions 404-1 and 404-2 respectively represent a horizontally-polarized version and a vertically-polarized version. As yet another example, the antenna 126 comprises a bowtie antenna 420, which includes directional feed ports 422-1 and 422-2. In this case, the versions 404-1 and 404-2 represent different angular directions of the radar receive signal 210 that are sensed along different angles of arrival.

In FIG. 4, the feed ports 402 and the versions 404 of the radar receive signal 210 are shown to be associated with the antenna 126. Alternatively or in addition to, the feed ports 402 and the versions 404 may be obtained using two different antennas. In general, any type of feed port 402 (including the feed ports 414-1, 414-2, 418-1, 418-2, 422-1, or 422-2) may be used to produce the multiple versions 404 if the feed ports 402 are in some way different from one another (e.g., sense different phases, polarizations, angles of arrivals, or are otherwise associated with different antennas that are placed at different physical locations). By using multiple feed ports 402, the described techniques for proximity detection using adaptive mutual coupling cancellation can operate without an extensive calibration process that characterizes a mutual coupling channel (e.g., without determining a transmit power associated with the radar transmit signal 208 or explicitly characterizing the mutual coupling between the transmitting and receiving antennas 126).

Figure 5:
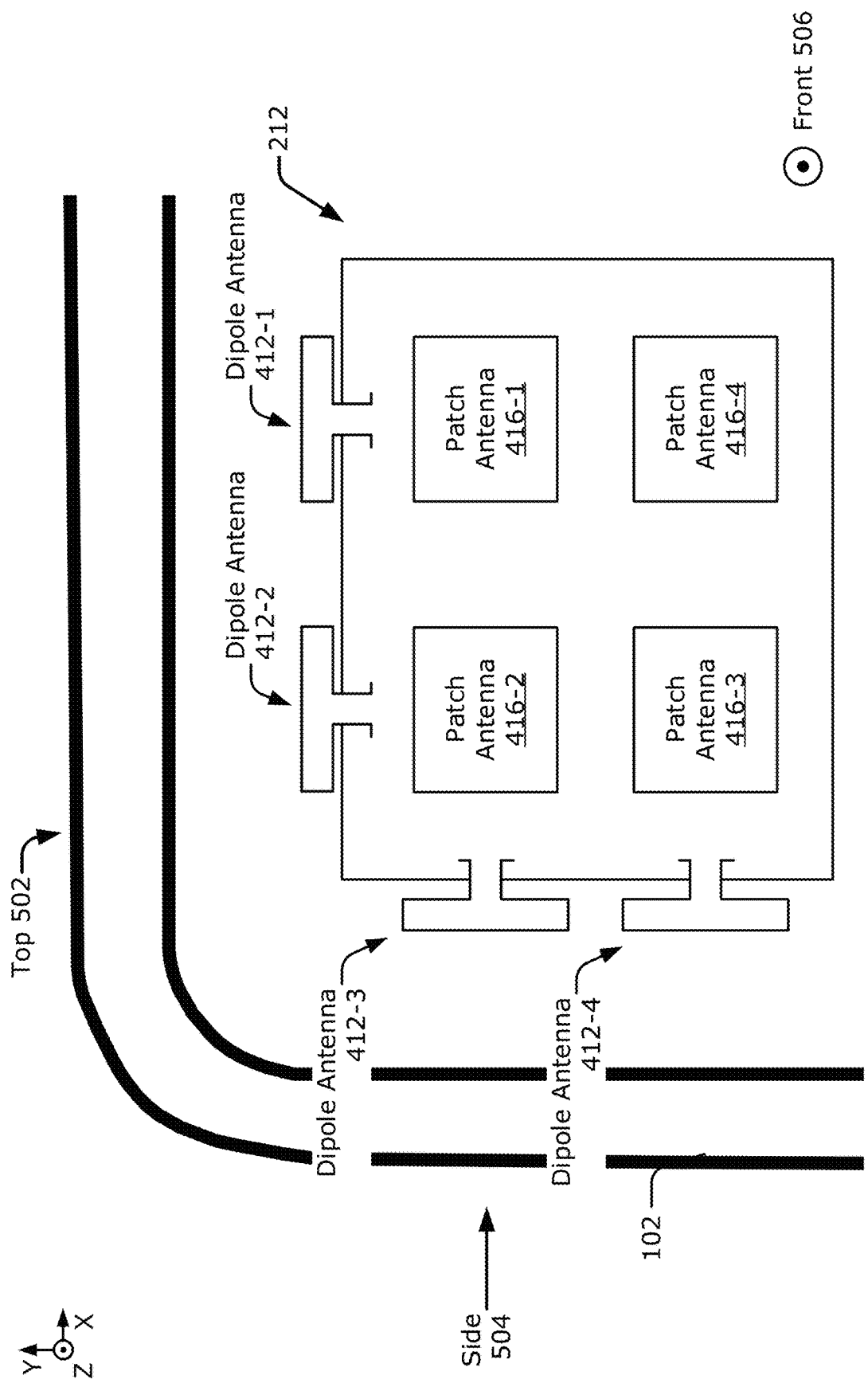
FIG. 5 illustrates an example antenna array for proximity detection using adaptive mutual coupling cancellation.

FIG. 5 illustrates an example antenna array 212 for proximity detection using adaptive mutual coupling cancellation. In the depicted configuration, the antenna array 212 is positioned in an upper-left corner of the computing device 102. To detect one or more objects 206 (of FIG. 2) that are positioned differently with respect to the computing device 102, the antenna array 212 includes a combination of four dipole antennas 412-1, 412-2, 412-3, and 412-4 and four patch antennas 416-1, 416-2, 416-3, and 416-4. The dipole antennas 412-1 and 412-2 can be used to detect an object 206 that is near a top 502 of the computing device 102 along a vertical direction or Y axis. Likewise, the dipole antennas 412-3 and 412-4 can detect another object 206 that is near a side 504 of the computing device 102 along a horizontal direction or X axis. The patch antennas 416-1, 416-2, 416-3, or 416-4 can detect an additional object 206 that is in front 506 of the computing device 102 or above the page along a Z axis.

In some implementations, the radar receive signal 210 (of FIGS. 2 and 4) may be sensed using a same antenna 126. For example, the dipole antenna 412-2 can transmit the radar transmit signal 208 and the dipole antenna 412-1 can generate the versions 404-1 and 404-2 of the radar receive signal 210 via the corresponding feed ports 414-1 and 414-2 (of FIG. 4). As another example, the patch antenna 416-2 can transmit the radar transmit signal 208 and the patch antenna 416-1 can generate the versions 404-1 and 404-2 via the feed ports 418-1 and 418-2.

In other implementations, the radar receive signal 210 may be sensed using different antennas 126. For example, the dipole antenna 412-2 can transmit the radar transmit signal 208 and the dipole antennas 412-1 and 412-3 can each respectively generate one of the versions 404-1 or 404-2. Alternatively, both dipole antennas 412-1 and 412-3 can respectively generate both of the versions 404-1 and 404-2 via respective feed ports 414-1 and 414-2. As another example, the patch antenna 416-2 can transmit the radar transmit signal 208 and each of the patch antennas 416-1 and 416-3 can respectively generate one of the versions 404-1 or 404-2. Alternatively, both patch antennas 416-1 and 416-3 can respectively generate both of the versions 404-1 and 404-2 via respective feed ports 418-1 and 418-2.

Different types of antenna 126 can also be used to respectively transmit or receive the radar signals 208 or 210. For example, the dipole antenna 412-2 can transmit the radar transmit signal 208, and each of the dipole antenna 412-3 and the patch antenna 416-2 can respectively generate one of the versions 404-1 or 404-2. In some cases, the dipole antenna 412-3 or the patch antenna 416-2 can generate multiple versions 404 such that a total quantity of versions 404 is greater than two. Although not explicitly depicted, multiple radar transmit signals 208 may also be transmitted simultaneously. For example, the dipole antenna 412-1 or 412-2 can transmit a radar transmit signal 208 towards the top 502 of the computing device 102 while one of the patch antennas 416-1, 416-2, 416-3, or 416-4 transmits another radar transmit signal 208 towards the front 506 of the computing device 102.

By utilizing different types of antennas 126 or by having the antennas 126 positioned at different locations within or around the computing device 102, multiple locations of the object 206 (or multiple objects 206) can be monitored using the described techniques. This further enables transmission of the uplink signal 202 to be independently adjusted relative to which one or more antennas 126 detect the object 206. Such independent detection therefore enables two or more of the antenna 126 to be configured for different purposes. For example one of the antennas 126 can be configured for enhanced communication performance while another one of the antennas 126 is simultaneously configured to comply with FCC requirements. As described in further detail with respect to FIG. 6, some of the components of the wireless transceiver 120 can be utilized for both wireless communication and proximity detection.

Figure 6:
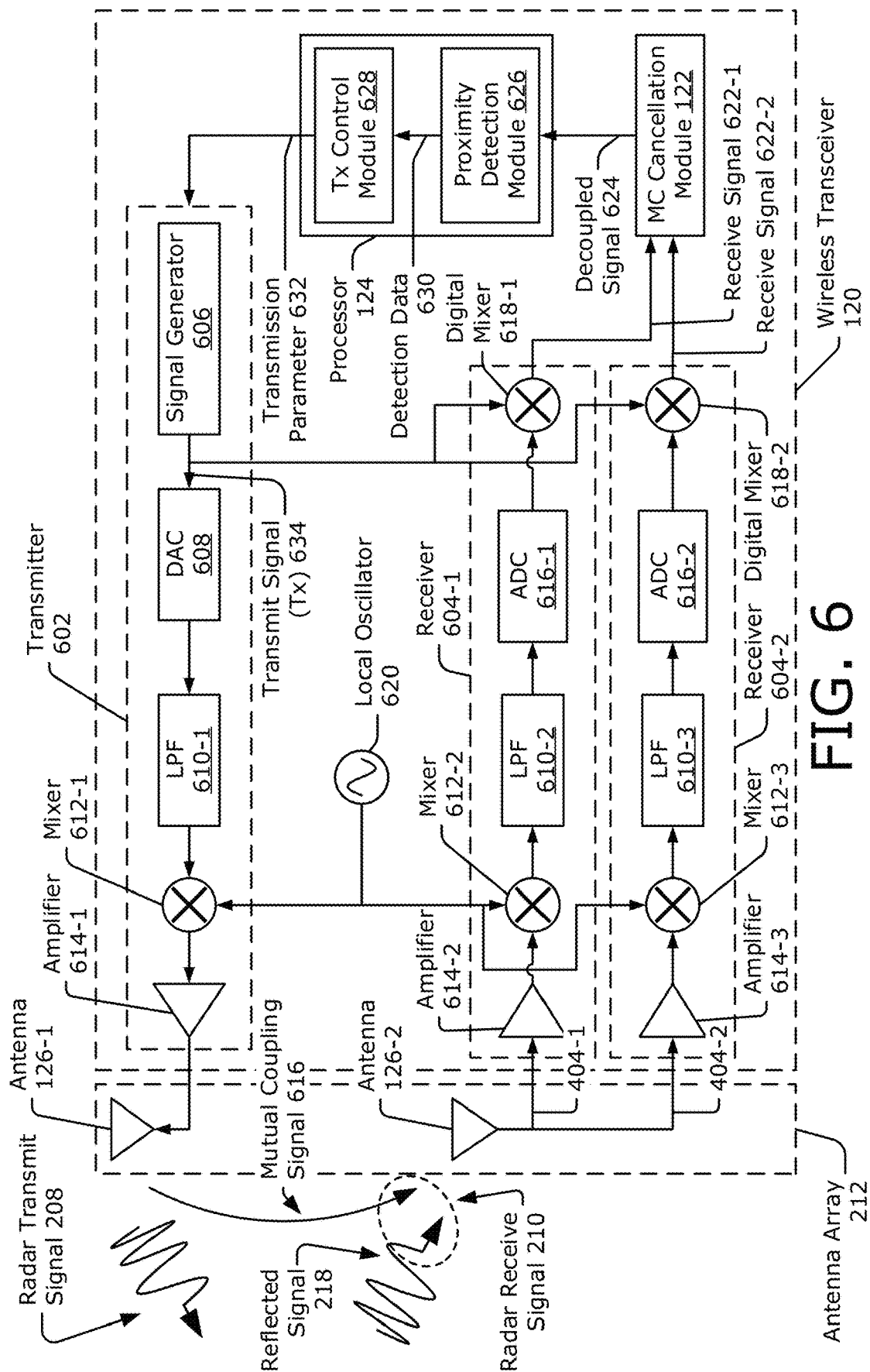
FIG. 6 illustrates an example wireless transceiver, mutual coupling cancellation module, and processor for proximity detection using adaptive mutual coupling cancellation.

FIG. 6 illustrates an example wireless transceiver 120, mutual coupling cancellation module 122, and processor 124 for proximity detection using adaptive mutual coupling cancellation. The wireless transceiver 120 includes a transmitter 602 and receivers 604-1 and 604-2, which are respectively connected between the mutual coupling cancellation module 122 and the antenna array 212. The transmitter 602 is shown to include a signal generator 606, a digital-to-analog converter (DAC) 608, a filter 610-1 (e.g., a low-pass filter (LPF)), a mixer 612-1, and an amplifier 614-1. The signal generator 606 can generate a digital transmit signal 634, which may be used to derive the radar transmit signal 208 or the uplink signal 202 (of FIGS. 2 and 3). The transmitter 602 is connected to at least one feed port 402-1 or 402-2 of the antenna 126-1, such as at least one of the differential feed ports 414 of the dipole antenna 412, at least one of the polarized feed ports 418 of the patch antenna 416, or at least one of the directional feed ports 422 of the bowtie antenna 420, as shown in FIG. 4.

The receivers 604-1 and 604-2 represent two parallel receive chains within the wireless transceiver 120 that are respectively connected to two feed ports 402-1 and 402-2 (of FIG. 4) of the antenna 126-2. Although a single antenna 126-2 is shown to be connected to the two receive chains, the two receivers 604-1 and 604-2 can alternatively be respectively connected to two different antennas 126, such as the second antenna 126-2 and the Nth antenna 126-N of FIG. 2. Each receive chain respectively includes amplifiers 614-2 and 614-3 (e.g., low-noise amplifiers), mixers 612-2 and 612-3, filters 610-2 and 610-3 (e.g., LPFs), analog-to-digital converters (ADC) 616-1 and 616-2, and digital mixers 618-1 and 618-2. The wireless transceiver 120 also includes a local oscillator 620, which generates a reference signal enabling the mixers 612-1, 612-2, and 612-3 to upconvert or downconvert analog signals within the transmit or receive chains. The transmitter 602 and the receivers 604-1 and 604-2 can also include other additional components that are not depicted in FIG. 6 such as band-pass filters, additional mixers, switches, and so forth.

Using these components, the wireless transceiver 120 can transmit the uplink signal 202 or receive the downlink signal 204 (of FIGS. 2 and 3) for wireless communications. For proximity detection, the transmitter 602 generates the radar transmit signal 208 via the antenna 126-1, and the receivers 604-1 and 604-2 receive different versions 404 of the radar receive signal 210 via the antenna 126-2. The response of the antenna 126-2 is separated into the versions 404-1 and 404-2 via the feed ports 402-1 and 402-2. Using the digital mixers 618-1 and 618-2 and the transmit signal 634, the receivers 604-1 and 604-2 demodulate the radar receive signal 210 and produce the receive signals 622-1 and 622-2, respectively.

At least one of the receive signals 622-1 and 622-2 includes a beat frequency, which is indicative of a frequency offset between the radar transmit signal 208 and the radar receive signal 210. The beat frequency is proportional to a range to the object 206. The mutual coupling cancellation module 122 performs the mutual coupling cancellation 410 of FIG. 4 and generates a decoupled signal 624 based on the receive signals 622-1 and 622-2. The mutual coupling cancellation module 122 processes the receive signals 622-1 and 622-2 in such a way as to attenuate the mutual coupling signal 216 and enable the beat frequency to be detected. In this way, the decoupled signal 624 substantially includes the reflected component or beat frequency and omits or filters a mutual coupling component that is associated with the mutual coupling signal 216.

In FIG. 6, the processor 124 includes at least one proximity detection module 626 and at least one transmitter (Tx) control module 628. The proximity detection module 626 obtains the decoupled signal 624 and generates detection data 630, which indicates whether or not the object 206 is detected. The detection data 630 can also include a range to the object 206.

Based on the detection data 630, the transmitter control module 628 generates at least one transmission parameter 632 that controls one or more transmission attributes for wireless communication. The transmission parameter 632 can specify one or more transmission-related aspects of the uplink signal 202, such as a power level, polarization, frequency, duration, beam shape, beam steering angle, a selected antenna that transmits the uplink signal 202 (e.g., another antenna that is on a different surface of the computing device 102 and is not obstructed by the object 206), or combinations thereof. Some transmission parameters 632 may be associated with beam management, such as those that define an unobstructed volume of space for beam sweeping. By specifying the transmission parameter 632, the processor 124 can, for example, cause the transmitter 602 to decrease power if an object 206 is close to the computing device 102 or increase power if the object 206 is at a farther range or is not detectable. The ability to detect the object 206 and control the transmitter 602 enables the processor 124 to balance the performance of the computing device 102 with regulatory compliance guidelines. In other implementations, the application processor 108 can perform one or more of these functions.

Although not explicitly shown, multiple antennas 126 can be used to sense additional versions 404 of the radar receive signal 210 (e.g., a third version or a fourth version) and provide additional receive signals 622 to the mutual coupling cancellation module 122 (e.g., a third receive signal 622 or a fourth receive signal 622). For example, two or more of the patch antennas 416 of FIG. 5 may be used to receive the radar receive signal 210. In this way, additional information can be provided to the mutual coupling cancellation module 122 to improve the mutual coupling cancellation 410. The mutual coupling cancellation module 122 can also generate multiple decoupled signals 624 associated with different pairs of receive signals 622 to increase a probability of detecting the object 206 (or accurately determining a range thereof) or to decrease a probability of false alarms. The transmitter control module 628 can also make different adjustments based on which antennas 126 or what quantity of antennas 126 detect the object 206. In some cases, these adjustments may impact beam management by focusing available beams or targeting a spatial area for beam determination.

For example, in some situations, the object 206 may be closer to one of the antennas 126 than another, which enables the one antenna 126 to detect the object 206 while the other antenna 126 is unable to detect the object 206. In this case, the transmitter control module 628 can decrease a transmit power of the antenna 126 that detected the object 206 relative to the other antenna 126. In some implementations, the multiple antennas 126 can be used to further characterize the relationship between the object 206 and the antennas 126, such as by using triangulation to estimate an angle to the object 206. In this way, the transmitter control module 628 can adjust the transmission parameter 632 to steer the uplink signal 202 away from the object 206.

Although the wireless transceiver 120 is shown as a direct-conversion transceiver in FIG. 6, the described techniques can also be applied to other types of transceivers, such as superheterodyne transceivers. In general, the mutual coupling cancellation module 122 can provide interference cancellation between any two or more receive signals 622. Operations of the mutual coupling cancellation module 122 are further described with respect to FIGS. 7-9.

Figure 7:
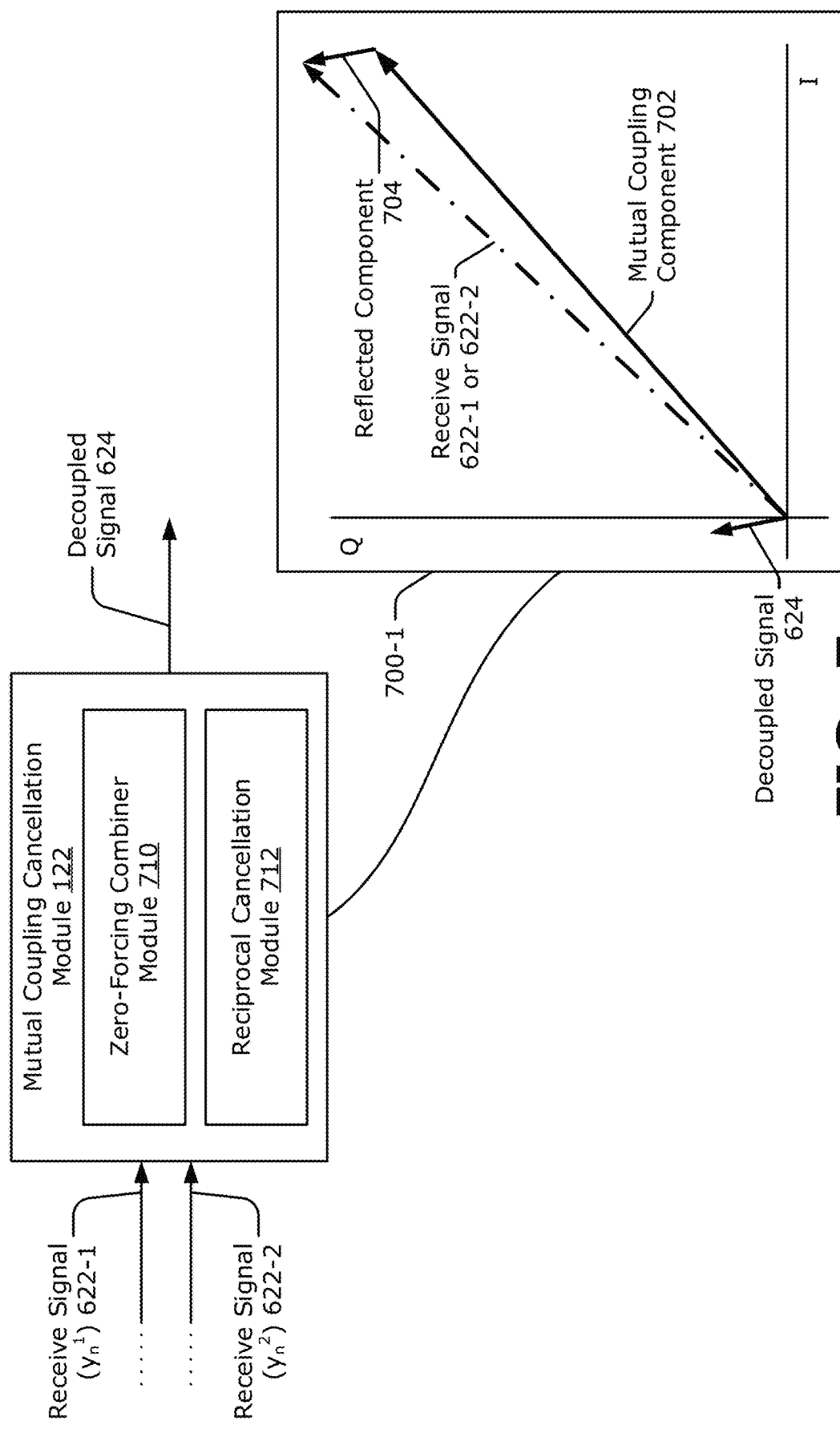
FIG. 7 illustrates an example scheme performed by a mutual coupling cancellation module for proximity detection using adaptive mutual coupling cancellation.

FIG. 7 illustrates an example scheme performed by a mutual coupling cancellation module 122 for proximity detection using adaptive mutual coupling cancellation. The mutual coupling cancellation module 122 obtains the receive signals 622-1 and 622-2. At 700-1, the receive signal 622-1 or 622-2 is represented by a vector, which includes a mutual coupling component 702 and a reflected component 704. The mutual coupling component 702 results from the mutual coupling between the antennas 126 (e.g., the mutual coupling signal 216 of FIG. 2) while the reflected component 704 results from the object 206 reflecting the radar transmit signal 208 (e.g., the reflected signal 218 of FIG. 2). The reflected component 704 contains information about the object 206 (e.g., the beat frequency) that enables the range to the object 206 to be determined. In general, the receive signals 622-1 and 622-2 can be respectively represented by $y_n^1$ and $y_n^2$ according to Equation 1, below:

$$y_n^x = A_{MC} h_{MC}^x s_{MC}(n) + \alpha_R h_R^x s_R(n) + n_x \quad \text{Equation 1}$$

where n represents a discrete time interval, x represents different responses of the antenna 126 to the radar receive signal 210 (e.g., the version 404-1 or the version 404-2 as shown in FIG. 4 or 6), $A_{MC}$ and $\alpha_R$ represent the respective amplitudes of the mutual coupling component 702 and the reflected component 704, $s_{MC}$ and $s_R$ represent respective complex sinusoidal signals of the mutual coupling component 702 and the reflected component 704, $h_{MC}$ and $h_R$ represent respective channel coefficients associated with a mutual coupling channel and a reflection channel, and $n_x$ represents independent additive white gaussian noise (AWGN). In general, the channel coefficients are unknown without a training procedure or calibration process and can vary over time. The receive signals 622-1 and 622-2 can be processed as a 2×1 matrix as shown in Equation 2:

$$\bar{y} = A_{MC} \begin{bmatrix} h_{MC}^1 \\ h_{MC}^2 \end{bmatrix} s_{MC}(n) + \alpha_R \begin{bmatrix} h_R^1 \\ h_R^2 \end{bmatrix} s_R(n) + \begin{bmatrix} n_1 \\ n_2 \end{bmatrix} \quad \text{Equation 2}$$
$$= A_{MC} \overline{h_{MC}} s_{MC}(n) + \alpha_R \overline{h_R} s_R(n) + \bar{n}$$

Two properties of the mutual coupling component 702 enable the described techniques to cancel (e.g., remove, suppress, attenuate, or filter) the mutual coupling component 702 without explicit knowledge of the mutual coupling channel coefficients ($\overline{h_{MC}}$). A first property includes the mutual coupling component 702 being several orders of magnitude larger than the reflected component 704

$$\left(\text{e.g., } \frac{A_{MC}^2}{\alpha_R^2} > 25 \text{ dB}\right).$$

A second property includes the respective mutual coupling components 702 in the receive signals 622-1 and 622-2 being highly correlated. The strength and correlation of the mutual coupling components 702 enables the mutual coupling cancellation module 122 to produce at least one decoupled signal 624 that substantially includes the reflected component 704. In other words, a power of the mutual coupling component 702 is suppressed within the decoupled signal 624 relative to powers of the mutual coupling component 702 respectively within the two receive signals 622-1 and 622-2.

The mutual coupling cancellation module 122 can be implemented using, for example, a zero-forcing combiner module 710 or a reciprocal cancellation module 712 (including both modules). The zero-forcing combiner module 710 suppresses the mutual coupling component 702 by combining interference null-space projections of the two receive signals 622-1 and 622-2 to generate the decoupled signal 624. This technique is described in further detail with respect to FIG. 8. The zero-forcing combiner module 710 is relatively easy to scale to more than two receive signals 622, which can be provided via more than two feed ports 402 of one or more antennas. Additional receive signals 622 provide additional information to the zero-forcing combiner module 710, which further improves the determination of the orthogonal direction and suppression of the mutual coupling component 702. The zero-forcing combiner module 710 can be implemented in hardware (e.g., via an integrated circuit) or software (e.g., as computer executable instructions stored in the computer-readable storage medium 110 and executed by the processor 124). In some implementations, a software implementation is utilized if the mutual coupling cancellation module 122 is to process larger quantities of receive signals 622 (e.g., more than four receive signals 622).

The reciprocal cancellation module 712 can also generate the decoupled signal 624. To do so, the reciprocal cancellation module 712 subtracts a scaled version of one of the receive signals 622-1 or 622-2 from another of the receive signals 622-1 or 622-2 to generate the decoupled signal 624. The reciprocal cancellation module 712 determines the appropriate scaling by using a least squares adaptation criteria and minimizing the mean-square error. This technique is described in further detail with respect to FIG. 9. Similar to the zero-forcing combiner module 710, the reciprocal cancellation module 712 may also be implemented in hardware or software. In some cases, the reciprocal cancellation module 712 may be less complex (e.g., may perform fewer computations) relative to the zero-forcing combiner module 710 to generate a given decoupled signal 624.

The zero-forcing combiner module 710 or the reciprocal cancellation module 712 decouple the mutual coupling component 702 and the reflected component 704 without explicit knowledge of the mutual coupling channel coefficient shown in Equation 1. In some cases, a portion of the energy associated with the reflected component 704 may be lost. Any change to the reflected component 704, however, is relatively minor compared to the suppression of the mutual coupling component 702 such that the decoupled signal 624 can still be used to detect the object 206 and determine the range to the object 206.

In some cases, the mutual coupling cancellation module 122 can include both the zero-forcing combiner module 710 and the reciprocal cancellation module 712 and enable either technique to generate the decoupled signal 624. Accordingly, the mutual coupling cancellation module 122 may toggle (e.g., switch) between using the zero-forcing combiner 710 or the reciprocal cancellation module 712. The toggling can occur based on, for example, a quantity of receive signals 622 that are provided to the mutual coupling cancellation module 122 (e.g., a quantity of feed ports 402 that are used to receive the radar receive signal 210), computational ability of the processor 124, and so forth. For instance, the zero-forcing combiner module 710 or the reciprocal cancellation module 712 can respectively be employed if more than two receive signals 622 or if two receive signals 622 are provided to the mutual coupling cancellation module 122.

Alternatively, the mutual coupling cancellation module 122 can enable both the zero-forcing combiner 710 and the reciprocal cancellation module 712 to operate in parallel to generate two decoupled signals 624. The proximity detection module 626 of FIG. 6 can use the multiple decoupled signals 624 to improve an accuracy of the detection data 630 or reduce false alarms. The zero-forcing combiner module 710 and the reciprocal cancellation module 712 are further described with respect to FIGS. 8 and 9, respectively.

Figure 8:
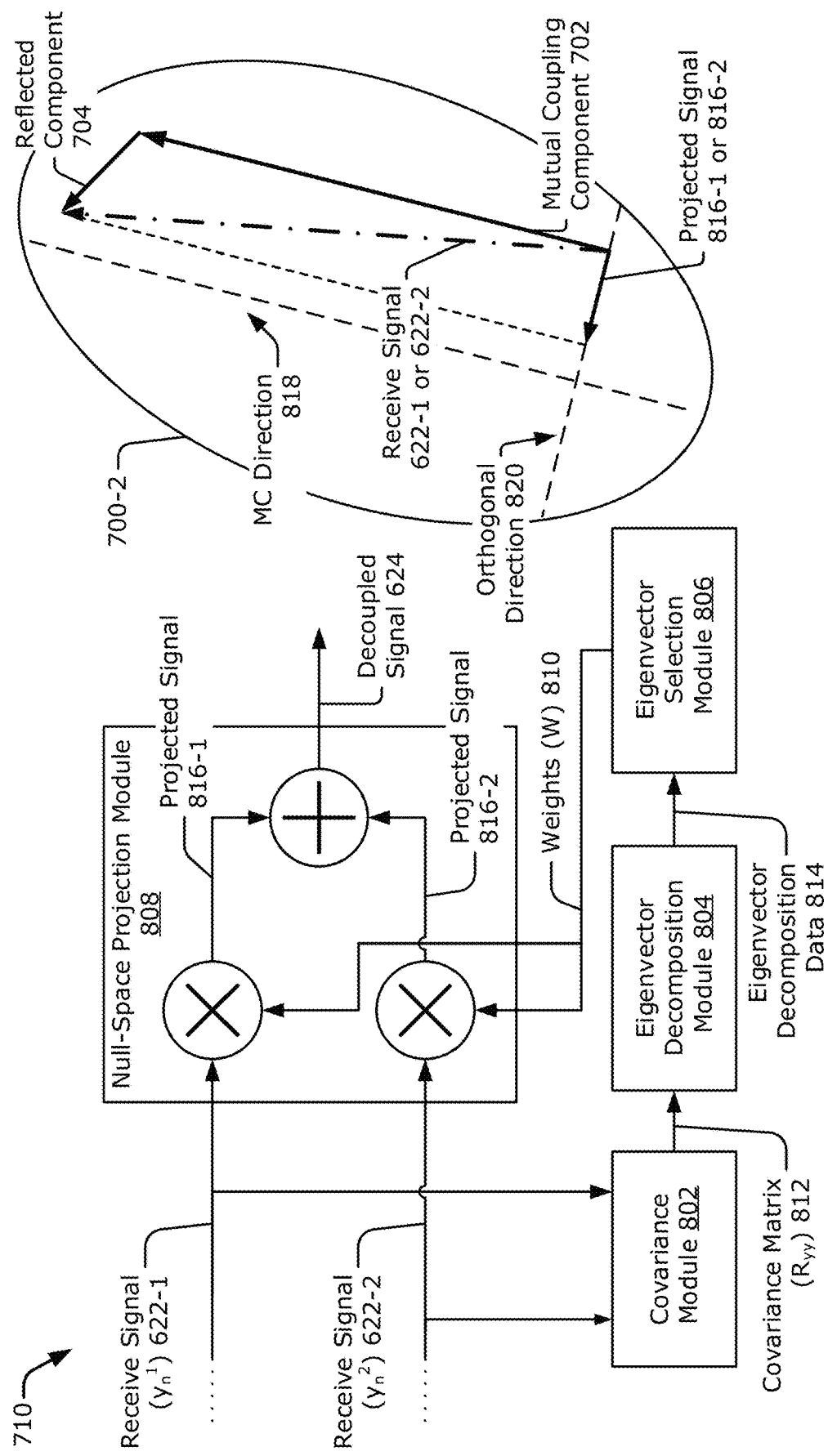
FIG. 8 illustrates an example scheme performed by a zero-forcing combiner module for proximity detection using adaptive mutual coupling cancellation.

FIG. 8 illustrates an example scheme performed by a zero-forcing combiner module 710 for proximity detection using adaptive mutual coupling cancellation. The zero-forcing combiner module 710 includes a covariance module 802, an eigenvector decomposition module 804, an eigenvector selection module 806, and a null-space projection module 808. In general, the zero-forcing combiner module 710 determines one or more weights 810 (e.g., filter coefficients) that project the receive signals 622-1 and 622-2 onto an interference null-space (e.g., a direction that is orthogonal to the mutual coupling component 702). At 700-2, a mutual coupling direction is shown via MC direction 818 and a direction that is orthogonal to the mutual coupling direction is shown as orthogonal direction 820. The weights 810 are chosen to minimize an interference over noise ratio at an output of the zero-forcing combiner module 710.

The covariance module 802 obtains the receive signals 622-1 and 622-2 and generates a covariance matrix ($\overline{R_{yy}}$) 812. The eigenvector decomposition module 804 determines the eigenvector decomposition of the covariance matrix 812 and generates eigenvector decomposition data 814, which includes eigenvalues and eigenvectors. The resulting operations of the covariance module 802 and the eigenvector decomposition module 804 are shown in Equation 3 below:

$$\overline{R_{yy}} = E[\overline{y}\overline{y}^T] = \Sum_{i=1}^{r} \lambda_i \overline{v}_i \overline{v}_i^T \qquad \text{Equation 3}$$

where $E[\ ]$ represents an expected value function, the exponent $^T$ represents a matrix transform operation, r represents a quantity of receive signals 622—which is two in this example, $\lambda_i$ represents an eigenvalue, $\overline{v}_i$ represents an eigenvector, and $\overline{y}$ is represented in Equation 2.

Based on the eigenvector decomposition data 814, the eigenvector selection module 806 selects an eigenvector that is associated with a smallest eigenvalue. Because the mutual coupling component 702 is significantly stronger than the reflected component 704 and is correlated between the receive signals 622-1 and 622-2, one of the eigenvalues is significantly stronger than the other eigenvalue. Thus, an eigenvector associated with the stronger eigenvalue is correlated to the mutual coupling direction 818, and an eigenvector associated with the weaker eigenvalue is correlated to the orthogonal direction 820. Based on these correlations, the eigenvector selection module 806 generates the weights 810 based on the eigenvector associated with the smallest eigenvalue. The null-space projection module 808 applies the weights 810 to the receive signals 622-1 and 622-2 using a multiplication operation to generate the projected signals 816-1 and 816-2. The projected signal 816-1 or 816-2 is shown at 700-2 as the projection of receive signal 622-1 or 622-2 onto the orthogonal direction 820. As illustrated in 700-2, the projected signal 816-1 or 816-2 substantially includes the reflected component 704. The null-space projection module 808 sums the projected signals 816-1 and 816-2 together to generate the decoupled signal 624.

The zero-forcing combiner module 710 can also be easily scaled to process more than two receive signals 622. In some cases, three, four, or more receive signals 622 can be provided to the covariance module 802, which increases a dimensional size of the covariance matrix 812 and increases a quantity of computations to generate the eigenvector decomposition data 814. Although there are more than two eigenvalues and eigenvectors in this situation, the eigenvector selection module 806 selects the eigenvector associated with a smallest eigenvalue and the resulting projected signals 816 are combined by the null-space projection module 808 to produce the decoupled signal 624.

Figure 9:
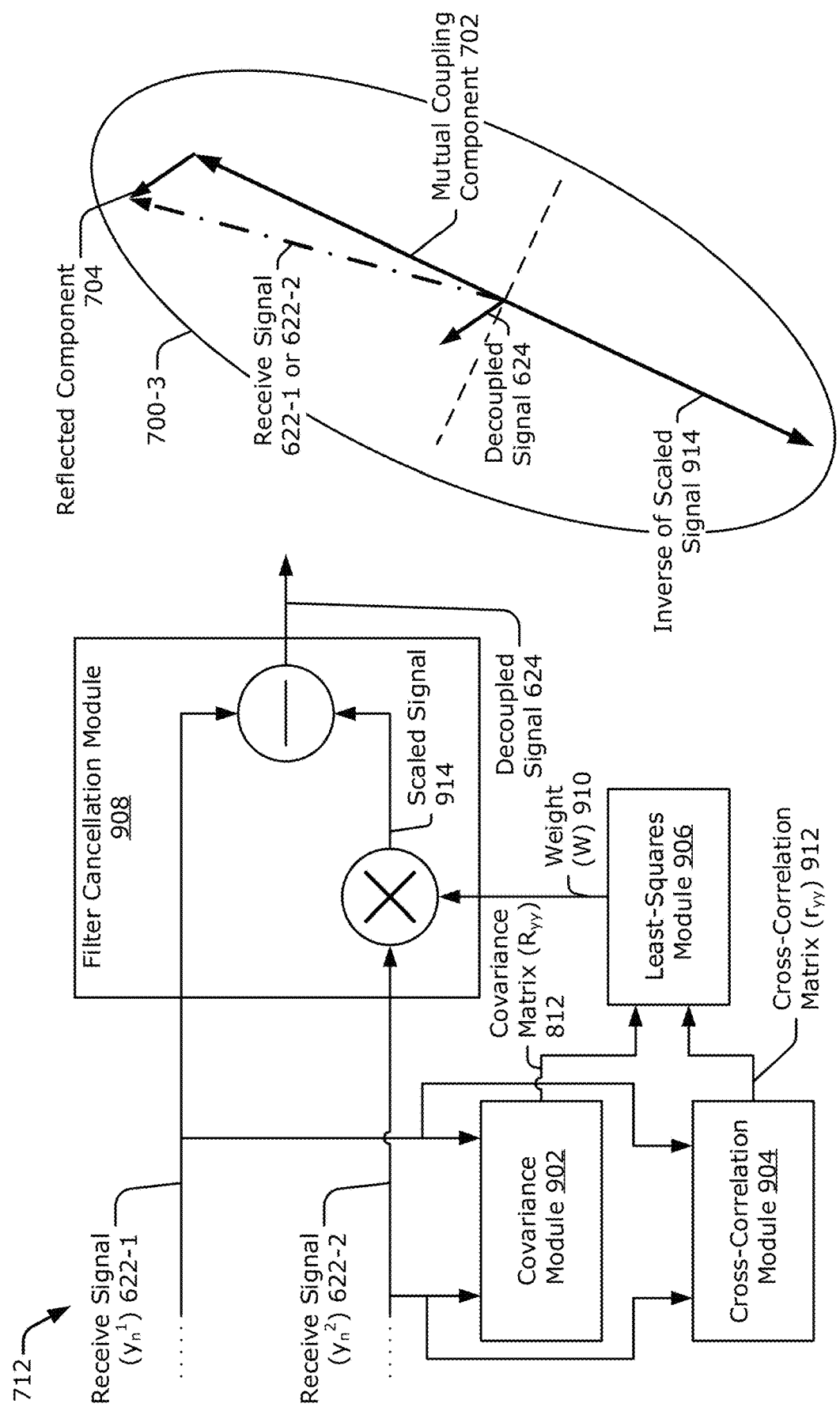
FIG. 9 illustrates an example scheme performed by a reciprocal cancellation module for proximity detection using adaptive mutual coupling cancellation.

FIG. 9 illustrates an example scheme performed by a reciprocal cancellation module 712 for proximity detection using adaptive mutual coupling cancellation. The reciprocal cancellation module 712 includes a covariance module 902, a cross-correlation module 904, a least-squares module 906, and a filter cancellation module 908. In general, the reciprocal cancellation module 712 uses least-squares approximation to determine at least one weight 910 (e.g., filter coefficient or complex weight) that scales a magnitude or phase of one of the receive signals 622-1 or 622-2 such that the mutual coupling component 702 in another one of the receive signals 622-1 or 622-2 can be canceled. In the depicted configuration, the receive signal 622-2 is scaled to produce a scaled signal 914, as described below. Because the mutual coupling component 702 is the dominant component, the weight 910 is chosen to minimize a mean-squared error between the receive signal 622-1 and the scaled version of the receive signal 622-2.

The covariance module 902 obtains the receive signals 622-1 and 622-2 and generates a covariance matrix ($\overline{R_{yy}}$) 812, as described above in Equation 3. The cross-correlation module 904 obtains the receive signals 622-1 and 622-2 and generates a cross-correlation matrix ($\overline{r_{yy}}$) 912. Using the covariance matrix 812 and the cross-correlation matrix 912, the least-squares module 906 generates the weight 910 according to Equation 4 below:

$$w = (R_{yy})^{-1} r_{yy} \qquad \text{Equation 4}$$

The filter cancellation module 908 multiples the receive signal 622-2 with the weight 910 to generate the scaled signal 914. The scaled signal 914 is subtracted from the receive signal 622-1 to generate the decoupled signal 624. Alternatively, the scaled signal 914 can be inverted and added to the receive signal 622-1 to generate the decoupled signal 624. An inverse of the scaled signal 914 is shown at 700-3, which is approximately equal in magnitude to the mutual coupling component 702 and approximately 180 degrees out of phase with respect to the mutual coupling component 702. If the other receive signal 622-1 or 622-2 is combined with the inverse of the scaled signal 914, the mutual coupling component 702 is effectively cancelled and the resulting decoupled signal 624 substantially includes the reflected component 704.

FIGS. 10-1, 10-2, 11-1, and 11-2 illustrate flow diagrams of example processes 1000-1, 1000-2, 1100-1, and 1100-2, respectively, for proximity detection using adaptive mutual coupling cancellation. The processes 1000-1, 1000-2, 1100-1, and 1100-2 are respectively described in the form of sets of blocks 1002-1006, 1008-1014, 1102-1106, and 1108-1114 that specify operations that can be performed. The operations, however, are not necessarily limited to the order shown in FIG. 10-1, 10-2, 11-1, or 11-2 or described herein, for the operations may be implemented in alternative orders or in fully or partially overlapping manners. Operations represented by the illustrated blocks of the processes 1000-1, 1000-2, 1100-1, or 1100-2 may be performed, for example, by a computing device 102 (e.g., of FIG. 1 or 2) or a wireless transceiver 120 (e.g., of FIG. 1 or 6). More specifically, the operations of the processes 1000-1, 1000-2, 1100-1, or 1100-2 may be performed by a mutual coupling cancellation module 122 or a processor 124 as shown in FIG. 1 or 6.

Figures 1, 10:
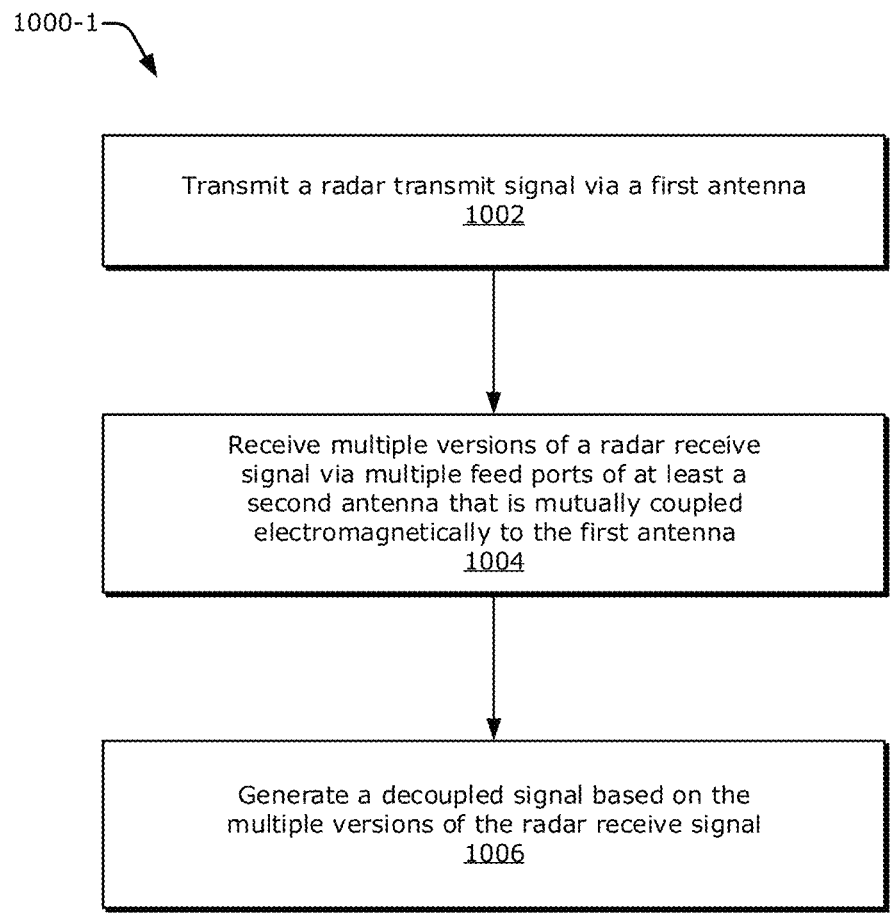
Figures 2, 10:
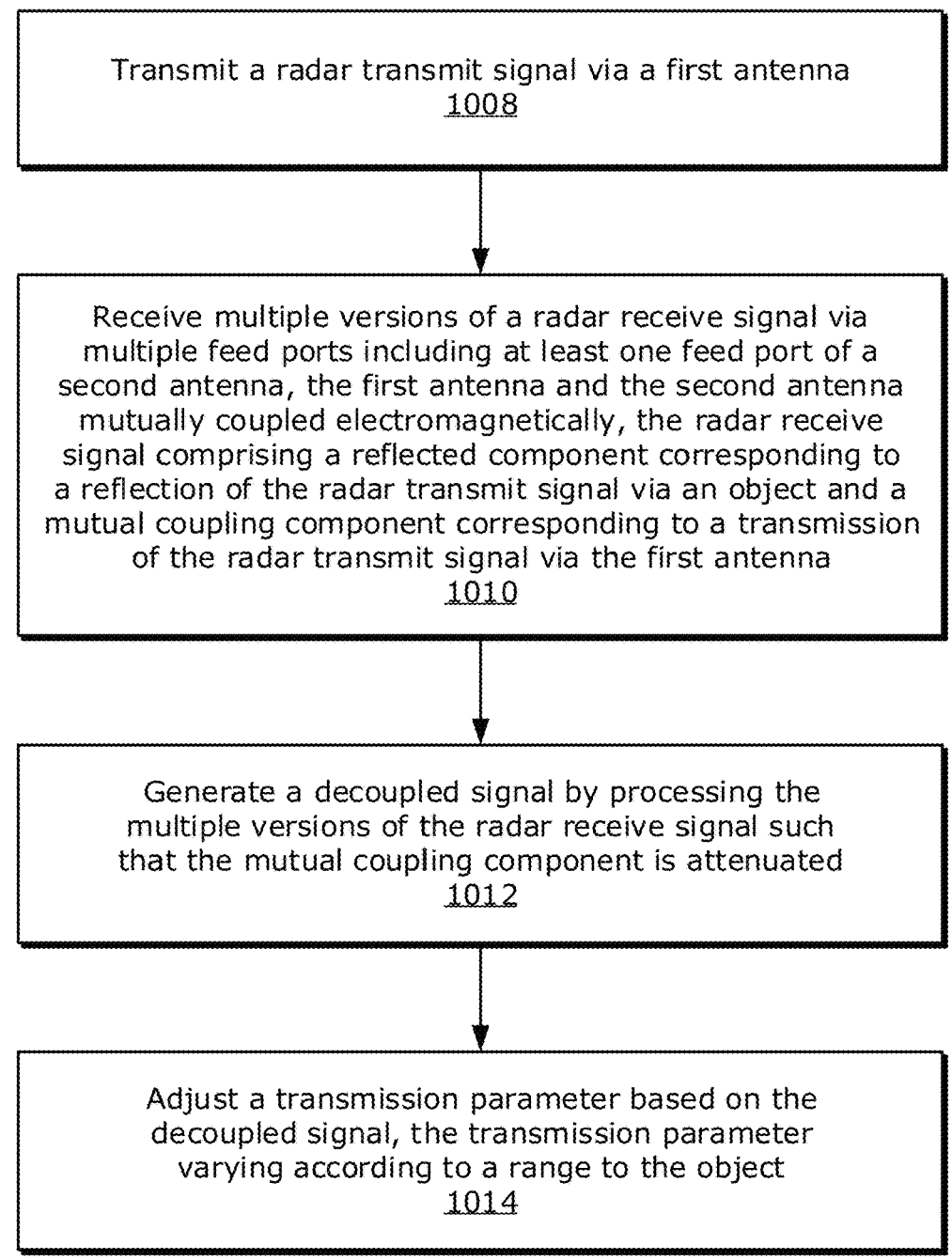

With respect to the process 1000-1 illustrated in FIG. 10-1, a radar transmit signal is transmitted via a first antenna at 1002. As shown in FIG. 6, the wireless transceiver 120 provides the first antenna 126-1 the radar transmit signal 208, which may comprise a frequency-modulated continuous wave signal or a frequency-modulated pulsed signal.

At 1004, multiple versions of a radar receive signal are received via multiple feed ports of at least a second antenna that is mutually coupled electromagnetically to the first antenna. As described with respect to FIG. 5, one or more antennas 126 can receive the radar receive signal 210 via feed ports 402-1 and 402-2. The radar receive signal 210 is based on the radar transmit signal 208 and may include the mutual coupling signal 216 and the reflected signal 218, as shown in FIGS. 2, 4, and 6.

At 1006, a decoupled signal is generated based on the multiple versions of the radar receive signal. As shown in FIG. 6, the mutual coupling cancellation module 122 generates the decoupled signal 624 based on the receive signals 622-1 and 622-2, which are respectively associated with feed ports 402-1 and 402-2. The decoupled signal 624 can be generated using the zero-forcing combiner module 710 or the reciprocal cancellation module 712, as illustrated in FIG. 7.

With respect to the process 1000-2 illustrated in FIG. 10-2, a radar transmit signal is transmitted via a first antenna at 1008. For example, the wireless transceiver 120 can transmit the radar transmit signal 208 using the first antenna 126-1, as shown in FIG. 6. The first antenna 126-1 may be implemented as any type of antenna, including a dipole antenna 412, a patch antenna 416, or a bowtie antenna 420 as shown in FIG. 4. The first antenna 126-1 can transmit the radar transmit signal 208 via one or more feed ports, including the differential feed ports 414, the polarized feed ports 418, or the directional feed ports 422. In some cases, multiple antennas 126 are used to transmit the radar transmit signal 208, as described with respect to FIG. 5.

At 1010, multiple versions of a radar receive signal are received via multiple feed ports including at least one feed port of a second antenna. The wireless transceiver 120, for example, can receive two versions 404-1 and 404-2 of the radar receive signal 210 using feed ports 402-1 and 402-2 of the second antenna 126-2, as shown in FIGS. 4 and 6. The first antenna 126-1 and the second antenna 126-2 are mutually coupled electromagnetically. The first antenna 126-1 and the second antenna 126-2 may be indirectly coupled due to relative proximity, as shown in FIG. 2. In some cases, one or more of the antennas 126, such as the first antenna 126-1 and the second antenna 126-2, may comprise antenna elements within the antenna array 212.

Here, the radar receive signal comprises a reflected component corresponding to a reflection of the radar transmit signal via an object and a mutual coupling component corresponding to a transmission of the radar transmit signal via the first antenna. As shown in FIG. 2, the radar receive signal 210 includes the reflected signal 218 and the mutual coupling signal 216, which are respectively represented by the reflected component 704 and the mutual coupling component 702 in FIG. 7.

The second antenna 126-2 may be implemented as any type of antenna, including a dipole antenna 412, a patch antenna 416, or a bowtie antenna 420 as shown in FIG. 4. The second antenna 126-2 can receive the multiple versions 404 of the radar receive signal 210 via the differential feed ports 414, the polarized feed ports 418, or the directional feed ports 422. In some cases, multiple antennas 126 are used to receive the multiple versions 404 of the radar receive signal 210, as described with respect to FIG. 5.

At 1012, a decoupled signal is generated by processing the multiple versions of the radar receive signal such that the mutual coupling component is attenuated. For example, the mutual coupling cancellation module 122 of FIG. 1, 6, or 7 can generate the decoupled signal 624 by processing the multiple receive signals 622, which are derived from the multiple versions 404 of the radar receive signal 210, to attenuate the mutual coupling component 702. The mutual coupling cancellation module 122 can use the zero-forcing combiner module 710 or the reciprocal cancellation module 712 to combine the multiple receive signals 622, as described with respect to FIGS. 7, 8 and 9.

At 1014, a transmission parameter is adjusted based on the decoupled signal, with the transmission parameter varying according to a range to the object. The transmitter control module 628, for example, can adjust the transmission parameter 632 based on the decoupled signal 624, as shown in FIGS. 3 and 6. Example transmission parameters 632 include a beam steering angle, a frequency, a communication protocol, a selected antenna or antenna array, a transmit power level, and so forth. The transmission parameter 632 can be varied according to a range of the object 206. For instance, a transmit power level may be increased for greater ranges to the object 206 and decreased for smaller ranges to the object 206. In some cases, the transmission parameter 632 is incrementally adjusted as the object 206 moves towards or away from the computing device 102 over time.

Figures 1, 11:
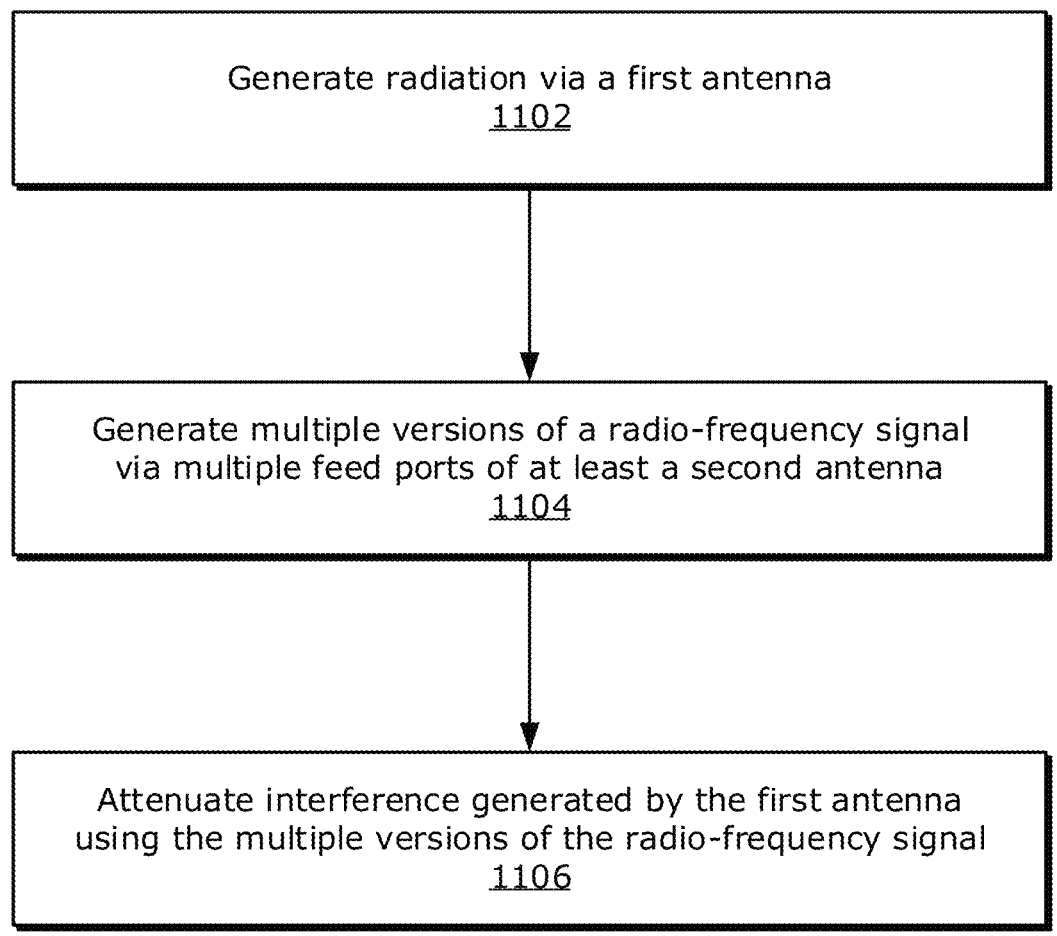
Figures 2, 11:
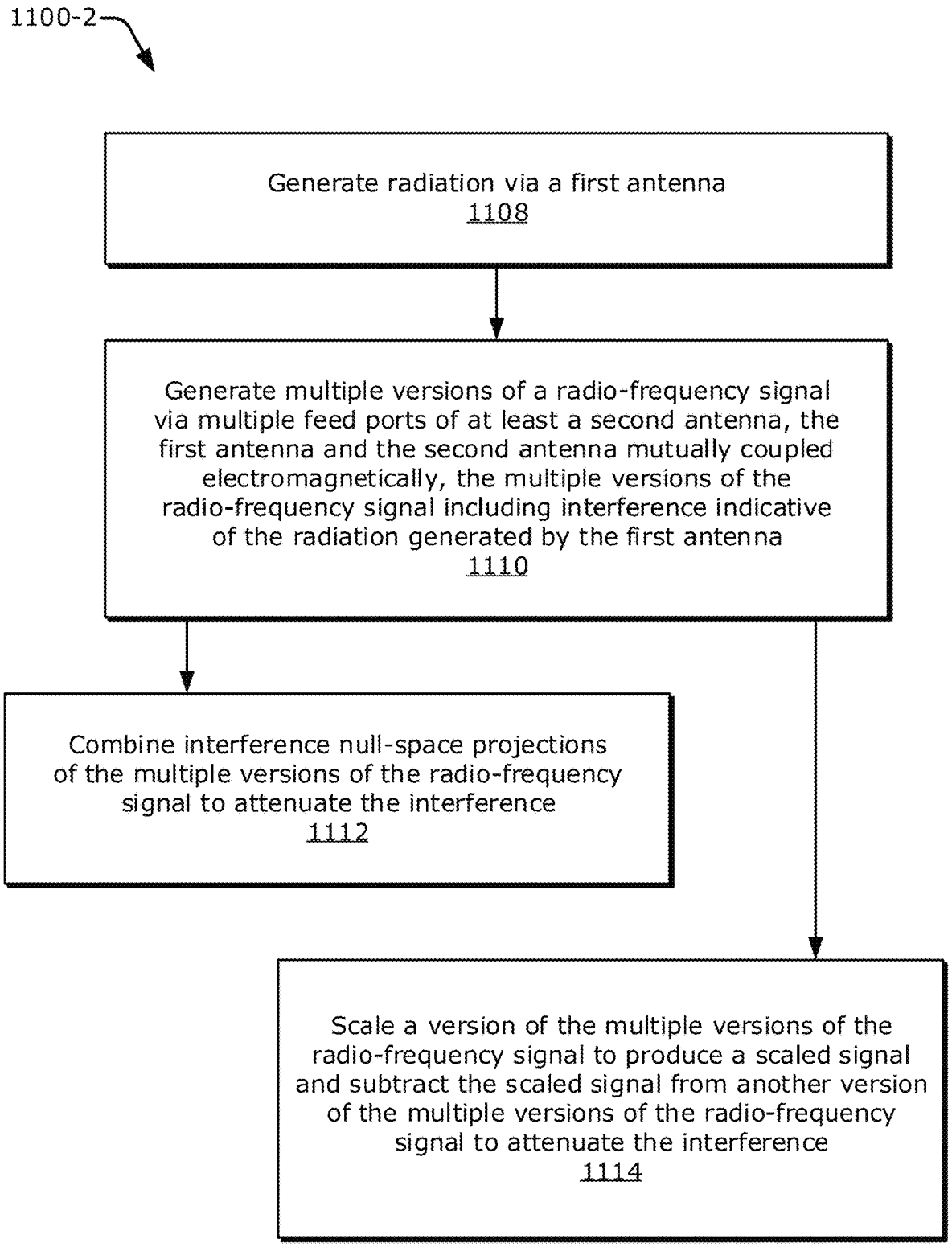

With respect to the process 1100-1 illustrated in FIG. 11-1, radiation is generated via a first antenna at 1102. For example, the first antenna 126-1 can generate radiation by transmitting the radar transmit signal 208, which is provided by the wireless transceiver 120.

At 1104, multiple versions of a radio-frequency signal are generated via multiple feed ports of at least a second antenna. As shown in FIGS. 4 and 6, the feed ports 402-1 and 402-2 generate the multiple versions 404-1 and 404-2 of the radar receive signal 210. The feed ports 402-1 and 402-2 may be associated with the second antenna 126-2 or different antennas 126, as described with respect to FIG. 5.

At 1106, interference generated by the first antenna is attenuated using the multiple versions of the radio-frequency signal. The interference is represented via the mutual coupling component 702. The mutual coupling cancellation module 122 attenuates the mutual coupling component 702 using the multiple versions 404-1 and 404-2. In some cases, more than two versions 404 of the radar receive signal 210 may be used to attenuate the interference.

With respect to the process 1100-2 illustrated in FIG. 11-2, radiation is generated via a first antenna at 1108. For example, the first antenna 126-1 can generate radiation by transmitting the radar transmit signal 208 provided by the wireless transceiver 120.

At 1110, multiple versions of a radio-frequency signal are generated via multiple feed ports of at least a second antenna. The first antenna and the second antenna are mutually coupled electromagnetically. The multiple versions of the radio-frequency signal include interference indicative of the radiation generated by the first antenna. For example, the second antenna 126-2 can generate the multiple versions 404 of the radar receive signal 210, which is a type of radio-frequency signal.

At 1112, interference null-space projections of the multiple versions of the radio-frequency signal are combined to attenuate the interference. For example, the zero-forcing combiner module 710 can project the receive signals 622-1 and 622-2, which are derived from the multiple versions 404 of the radar receive signal 210, onto the orthogonal direction 820 to produce the projected signals 816-1 and 816-2, as shown in FIG. 8. The zero-forcing combiner module 710 can then sum the projected signals 816-1 and 816-2 together to produce the decoupled signal 624. By projecting the receive signals 622-1 and 622-2 onto the orthogonal direction 820, the respective mutual coupling components 702 are suppressed.

At 1114, a version of the multiple versions of the radio-frequency signal is scaled to produce a scaled signal, and the scaled signal is subtracted from another version of the multiple versions of the radio-frequency signal to attenuate the interference. For example, the reciprocal cancellation module 712 can subtract the scaled signal 914 from the receive signal 622-1, as shown in FIG. 9. The scaled signal 914 can be derived from the receive signal 622-2. The receive signals 622-1 and 622-2 are respectively derived from the multiple versions 404 of the radar receive signal 210. By subtracting the scaled signal 914 from the receive signal 622-1, the mutual coupling component 702 in the receive signal 622-1 is suppressed. The operations described at 1112 and 1114 can be performed in sequence, in parallel, or in lieu of one another.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
    at least two antennas, the at least two antennas including a first antenna and a second antenna, the second antenna including two feed ports, the first antenna and the second antenna mutually coupled electromagnetically;
    a wireless transceiver connected to the at least two antennas, the wireless transceiver configured to:
        transmit a radar transmit signal via the first antenna;
        receive two versions of a radar receive signal respectively via the two feed ports of the second antenna, the radar receive signal comprising a reflected component corresponding to a reflection of the radar transmit signal via an object and a mutual coupling component corresponding to a transmission of the radar transmit signal via the first antenna; and
        adjust a transmission parameter based on a decoupled signal, the transmission parameter varying based on a range to the object; and
    a mutual coupling cancellation module connected to the two feed ports, the mutual coupling cancellation module configured to generate the decoupled signal based on the two versions of the radar receive signal.

2. The apparatus of claim 1, wherein the mutual coupling cancellation module is configured to generate the decoupled signal such that a power of the mutual coupling component is suppressed within the decoupled signal relative to powers of the mutual coupling component respectively within the two versions of the radar receive signal.

3. The apparatus of claim 1, wherein the radar transmit signal comprises:
    a frequency-modulated continuous-wave (FMCW) signal; or
    a frequency-modulated pulsed signal.

4. The apparatus of claim 1, wherein:
    the wireless transceiver is configured to:
        generate a digital transmit signal, the radar transmit signal derived from the digital transmit signal;
        generate two digital receive signals, the two digital receive signals respectively derived from the two versions of the radar receive signal; and
        mix the digital transmit signal with the two digital receive signals to respectively produce two receive signals; and
    the mutual coupling cancellation module is configured to generate the decoupled signal based on the two receive signals.

5. The apparatus of claim 4, wherein:
    the two receive signals include a respective beat frequency indicative of a frequency offset between transmission of the radar transmit signal and reception of the radar receive signal, the respective beat frequency proportional to the range to the object; and
    the mutual coupling cancellation module is configured to generate the decoupled signal to include the beat frequency.

6. The apparatus of claim 4, wherein the mutual coupling cancellation module includes a zero-forcing combiner, the zero-forcing combiner configured to combine interference null-space projections of the two receive signals to generate the decoupled signal.

7. The apparatus of claim 6, wherein the zero-forcing combiner is configured to:

generate a covariance matrix based on the two receive signals;
perform eigenvector decomposition on the covariance matrix to generate eigenvectors and eigenvalues;
generate one or more weights based on an eigenvector of the eigenvectors that is associated with a smallest eigenvalue of the eigenvalues;
project the two receive signals by multiplying the two receive signals by the one or more weights to generate two projected signals; and
perform a summation of the two projected signals to generate the decoupled signal.

8. The apparatus of claim 4, wherein the mutual coupling cancellation module includes a reciprocal cancellation module, the reciprocal cancellation module configured to subtract a scaled version of a signal of the two receive signals from another signal of the two receive signals to generate the decoupled signal.

9. The apparatus of claim 8, wherein the reciprocal cancellation module is configured to:
generate a covariance matrix based on the two receive signals;
generate a cross-correlation matrix based on the two receive signals;
perform least squares approximation of the signal with respect to the other signal based on the covariance matrix and the cross correlation matrix to produce at least one weight;
multiply the signal by the at least one weight to generate a scaled signal; and
subtract the scaled signal from the other signal to generate the decoupled signal.

10. The apparatus of claim 1, wherein the at least two antennas are configured to be arranged in respective positions such that the first antenna and the second antenna are mutually coupled electromagnetically.

11. The apparatus of claim 1, wherein:
the at least two antennas include a third antenna, the third antenna including a third feed port, the first antenna and the third antenna mutually coupled electromagnetically; and
the wireless transceiver is connected to the third antenna and is configured to obtain the two versions of the radar receive signal respectively via a feed port of the two feed ports of the second antenna and via the third feed port of the third antenna.

12. The apparatus of claim 1, wherein:
the at least two antennas include a third antenna, the third antenna including a third feed port, the first antenna and the third antenna mutually coupled electromagnetically, wherein:
the wireless transceiver is connected to the third antenna and is configured to respectively obtain three versions of the radar receive signal via each of the two feed ports of the second antenna and via the third feed port of the third antenna; and
the mutual coupling cancellation module is configured to generate the decoupled signal based on the three versions of the radar receive signal such that a power of the mutual coupling component is suppressed within the decoupled signal relative to the powers of the mutual coupling component respectively within the three versions of the radar receive signal.

13. The apparatus of claim 1, wherein the wireless transceiver is configured to transmit an uplink signal using the transmission parameter.

14. The apparatus of claim 1, wherein the transmission parameter comprises at least one of the following:
a power level;
a beam steering angle;
a frequency;
a selected antenna; or
a communication protocol.

15. The apparatus of claim 1, wherein:
the first antenna comprises one of the following:
a patch antenna including a horizontally-polarized feed port and a vertically-polarized feed port;
a dipole antenna including differential feed ports; or
a bowtie antenna including directional feed ports.

16. The apparatus of claim 15, wherein the wireless transceiver is configured to transmit the radar transmit signal using:
at least one of the horizontally-polarized feed port or the vertically-polarized feed port of the patch antenna;
at least one of the differential feed ports of the dipole antenna; or
at least one of the directional feed ports of the bowtie antenna.

17. The apparatus of claim 1, wherein:
the second antenna comprises one of the following:
a patch antenna including a horizontally-polarized feed port and a vertically-polarized feed port;
a dipole antenna including differential feed ports; or
a bowtie antenna including directional feed ports; and
the wireless transceiver is configured to produce the two versions of the radar receive signal using:
the horizontally-polarized feed port and the vertically-polarized feed port of the patch antenna;
the differential feed ports of the dipole antenna; or
the directional feed ports of the bowtie antenna.

18. An apparatus comprising:
at least two antennas, the at least two antennas including a first antenna and a second antenna, the first antenna and at least the second antenna mutually coupled electromagnetically;
a wireless transceiver connected to the at least two antennas, the wireless transceiver configured to:
transmit a radar transmit signal via the first antenna;
receive multiple versions of a radar receive signal via multiple feed ports including at least one feed port of the second antenna, the radar receive signal comprising a reflected component corresponding to a reflection of the radar transmit signal via an object and a mutual coupling component corresponding to a transmission of the radar transmit signal via the first antenna; and
adjust a transmission parameter based on a decoupled signal, the transmission parameter varying based on a range to the object; and
a mutual coupling cancellation circuit connected to the multiple feed ports, the mutual coupling cancellation circuit configured to generate the decoupled signal based on the multiple versions of the radar receive signal such that the mutual coupling component is suppressed.

19. The apparatus of claim 18, wherein:
the second antenna includes a first feed port and a second feed port;
the at least two antennas include a third antenna, the third antenna includes a third feed port, the first antenna and the third antenna are mutually coupled electromagnetically; and the wireless transceiver is connected to the third antenna and is configured to:
  receive the multiple versions of the radar receive signal respectively via the first feed port of the second antenna and the third feed port of the third antenna; or
  receive the multiple versions of the radar receive signal respectively via the first feed port of the second antenna, the second feed port of the second antenna, and the third feed port of the third antenna.

20. The apparatus of claim 18, wherein:
the wireless transceiver is configured to generate two receive signals, the two receive signals respectively comprising two digital signals derived from the multiple versions of the radar receive signal; and
the mutual coupling cancellation circuit is configured to combine the two receive signals to generate the decoupled signal such that a power of the mutual coupling component is suppressed within the decoupled signal relative to powers of the mutual coupling component respectively within the two receive signals.

21. The apparatus of claim 20, wherein the mutual coupling cancellation circuit comprises a zero-forcing combiner circuit configured to combine interference null-space projections of the two receive signals to generate the decoupled signal.

22. The apparatus of claim 21, wherein the zero-forcing combiner circuit is configured to:
  generate a covariance matrix based on the two receive signals;
  perform eigenvector decomposition on the covariance matrix to generate eigenvectors and eigenvalues;
  generate one or more weights based on an eigenvector of the eigenvectors that is associated with a smallest eigenvalue of the eigenvalues;
  project the two receive signals by multiplying the two receive signals by the one or more weights to generate two projected signals; and
  perform a summation of the two projected signals to generate the decoupled signal.

23. The apparatus of claim 20, wherein the mutual coupling cancellation circuit comprises a reciprocal cancellation circuit configured to subtract a scaled version of a signal of the two receive signals from another signal of the two receive signals to generate the decoupled signal.

24. The apparatus of claim 23, wherein the reciprocal cancellation circuit is configured to:
  generate a covariance matrix based on the two receive signals;
  generate a cross-correlation matrix based on the two receive signals;
  perform least squares approximation of the signal with respect to the other signal based on the covariance matrix and the cross-correlation matrix to produce at least one weight;
  multiply the signal by the at least one weight to generate a scaled signal; and
  subtract the scaled signal from the other signal to generate the decoupled signal.

25. A method for proximity detection using adaptive mutual coupling cancellation, the method comprising:
  transmitting a radar transmit signal via a first antenna;
  receiving multiple versions of a radar receive signal via multiple feed ports including at least one feed port of a second antenna, the first antenna and the second antenna mutually coupled electromagnetically, the radar receive signal comprising a reflected component corresponding to a reflection of the radar transmit signal via an object and a mutual coupling component corresponding to a transmission of the radar transmit signal via the first antenna;
  generating a decoupled signal by processing the multiple versions of the radar receive signal such that the mutual coupling component is attenuated; and
  adjusting a transmission parameter based on the decoupled signal, the transmission parameter varying according to a range to the object.

26. The method of claim 25, wherein the generating of the decoupled signal comprises at least one of the following:
  combining interference null-space projections of the multiple versions of the radar receive signal to generate the decoupled signal; or
  subtracting a scaled signal from a version of the multiple versions of the radar receive signal to generate the decoupled signal, the scaled signal derived from another version of the multiple versions of the radar receive signal.

27. The method of claim 26, further comprising toggling between at least the combining of the interference null-space projections and the subtracting of the scaled signal to generate the decoupled signal based on a quantity of the multiple versions of the radar receive signal.

28. An apparatus comprising:
  at least two antennas, the at least two antennas including:
    a first antenna configured to generate radiation; and
    a second antenna including multiple feed ports, the first antenna and the second antenna mutually coupled electromagnetically, the second antenna configured to generate multiple versions of a radio-frequency signal respectively via the multiple feed ports, the multiple versions of the radio-frequency signal including interference indicative of the radiation generated by the first antenna; and
  a mutual coupling cancellation module connected to the multiple feed ports, the mutual coupling cancellation module including:
    a zero-forcing combiner module configured to combine interference null-space projections of the multiple versions of the radio-frequency signal to attenuate the interference; and
    a reciprocal cancellation module configured to:
      scale a version of the multiple versions of the radio-frequency signal to produce a scaled signal; and
      subtract the scaled signal from another version of the multiple versions of the radio-frequency signal to attenuate the interference.

29. The apparatus of claim 28, wherein the mutual coupling cancellation module is configured to enable the zero-forcing combiner module and the reciprocal cancellation module to operate in parallel using the multiple versions of the radio-frequency signal.

30. The apparatus of claim 28, wherein the mutual coupling cancellation module is configured to enable the zero forcing combiner module or the reciprocal cancellation module based on a quantity of the multiple versions of the radio-frequency signal.

* * * * *